US010773672B2

(12) United States Patent
Takeuchi et al.

(10) Patent No.: US 10,773,672 B2
(45) Date of Patent: Sep. 15, 2020

(54) LEANING VEHICLE

(71) Applicant: YAMAHA HATSUDOKI KABUSHIKI KAISHA, Iwata-shi, Shizuoka (JP)

(72) Inventors: Tomohiro Takeuchi, Iwata (JP); Hiroshi Shibuya, Iwata (JP); Kotaro Onishi, Iwata (JP)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 0 days.

(21) Appl. No.: 16/592,893

(22) Filed: Oct. 4, 2019

(65) Prior Publication Data
US 2020/0031298 A1 Jan. 30, 2020

Related U.S. Application Data

(63) Continuation of application No. PCT/JP2018/017425, filed on May 1, 2018.

(30) Foreign Application Priority Data

Jun. 8, 2017 (JP) .................................. 2017-113781

(51) Int. Cl.
*B60Q 1/00* (2006.01)
*B60R 21/0132* (2006.01)
(Continued)

(52) U.S. Cl.
CPC ...... *B60R 21/0132* (2013.01); *B60G 17/0162* (2013.01); *B60W 40/105* (2013.01);
(Continued)

(58) Field of Classification Search
CPC ................................................ B60R 21/0132
(Continued)

(56) References Cited

U.S. PATENT DOCUMENTS

2002/0158754 A1 10/2002 Tabata et al.
2017/0151922 A1 6/2017 Obuchi
(Continued)

FOREIGN PATENT DOCUMENTS

EP 1197426 A1 4/2002
EP 2518710 A1 10/2012
(Continued)

OTHER PUBLICATIONS

BMW Motorrad: "Rider's Manual K 1600 GT", Jun. 1, 2016 (Jun. 1, 2016), p. 17,53,54, XP055679577,Retrieved from the Internet: URL:http //manuals.bmw-motorrad.com/manuals/BA-Extern/IN/BA-INTERNET-COM/PDK/K_0F01_RM_0616_01.pdf [retrieved on Mar. 25, 2020], pp. 17,53,54.
(Continued)

*Primary Examiner* — Tai T Nguyen
(74) *Attorney, Agent, or Firm* — Rabin & Berdo, P.C.

(57) ABSTRACT

A leaning vehicle includes a cancel switch for cancelling notification of overturn occurrence information. A handle includes one or more right switch boxes to the left of a right handle grip, and one or more left switch boxes to the right of a left handle grip. The cancel switch is a position that is within a center region located between a plane perpendicular to the left-right direction that includes the left end of a right switch box which is furthest to the left among the one or more right switch boxes, and a plane perpendicular to the left-right direction that includes the right end of a left switch box which is furthest to the right among the one or more left switch boxes. The cancel switch is at a position that is visible in one or more horizontal directions in the leaning vehicle in an overturned state.

10 Claims, 28 Drawing Sheets

(51) Int. Cl.
*B60G 17/016* (2006.01)
*B60W 40/105* (2012.01)
*B62J 45/40* (2020.01)

(52) U.S. Cl.
CPC ... *B60G 2800/9124* (2013.01); *B60T 2230/03* (2013.01); *B60W 2300/36* (2013.01); *B62J 45/40* (2020.02)

(58) Field of Classification Search
USPC ............. 340/440, 445, 435, 436, 438, 686.1
See application file for complete search history.

(56) References Cited

U.S. PATENT DOCUMENTS

| | | | |
|---|---|---|---|
| 2017/0274952 A1* | 9/2017 | Cheng | B60C 23/0454 |
| 2020/0031300 A1* | 1/2020 | Shibuya | B62J 3/14 |

FOREIGN PATENT DOCUMENTS

| | | |
|---|---|---|
| EP | 3162639 A1 | 5/2017 |
| JP | 2001-184580 A | 7/2001 |
| JP | 2001-328580 A | 11/2001 |
| JP | 2015-107798 A | 6/2015 |
| TW | 587561 U | 5/2004 |
| WO | 2015/198786 A1 | 12/2015 |

OTHER PUBLICATIONS

Rudolf-Andreas Probst, "With the optional 'Intelligent Emergency Call', BMW Motorrad is offering a motorcycle eCall system for the first time. Fast help in the case of an accident or an emergency situation.", [online] May 30, 2016, BMW Group, [Search Date: Nov. 9, 2016], Internet: URL: https://www.press.bmwgroup.com/global/article/detail/T0259550EN/.

Taiwan Patent Office, Office Action, Patent Application Serial No. TW107116966, dated Feb. 20, 2019.

* cited by examiner

Fig.4
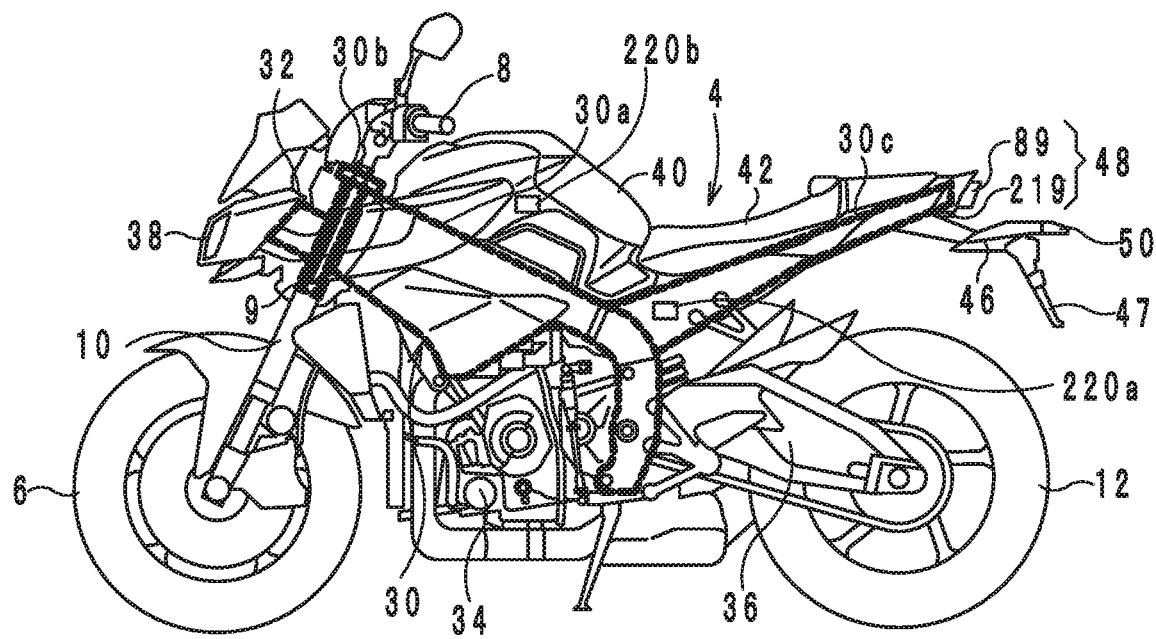
30:30a-30c
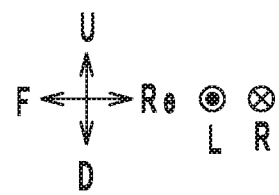

219:208, 212
250:252, 254, 256

135:135a, 135b
80:135, 219
60:60a, 60b

LEANING VEHICLE

CROSS-REFERENCE TO RELATED APPLICATIONS

This application is a continuation of International Application PCT/JP2018/017425 filed on May 1, 2018, which claims priority from Japanese Patent Application No. 2017-113781 filed on Jun. 8, 2017. The contents of each of the identified applications are entirely incorporated herein by reference.

BACKGROUND

Technical Field

The present invention relates to a leaning vehicle that includes a vehicle body that leans to the left when turning left and leans to the right when turning right.

Background Art

There is a possibility that a leaning vehicle such as a motorcycle will overturn during ordinary travel. Non Patent Literature 1 (identified further on) proposes a notification system that, in a case where a leaning vehicle overturns, notifies of the fact that the leaning vehicle has overturned to a third party by radio communication means. The notification system includes a function switch for sending a notification/cancelling a notification in a switch box that is positioned at the side of a handle grip.

An automatic notification device for a vehicle that is disclosed in Patent Literature 1 (identified further on) is known as an invention that cancels a notification in a notification preparatory state prior to notification. In FIG. 11 and FIG. 12 of Patent Literature 1, a helmet 31 that includes a radio telephone 5 is illustrated. If a two-wheeled vehicle has an accident, the radio telephone 5 of the helmet 31 automatically notifies the occurrence of the accident. Further, in FIG. 13 of Patent Literature 1, a two-wheeled vehicle that includes a radio telephone 5 is illustrated. If the two-wheeled vehicle has an accident, the radio telephone 5 of the two-wheeled vehicle automatically notifies the occurrence of the accident. Further, in FIG. 11 to FIG. 13 of Patent Literature 1, a configuration is illustrated in which a cancel switch 3 for cancelling a notification is built into the helmet 31. By this means, it is possible for a rider to cancel notification of an accident.

CITATION LIST

Non Patent Literature

Non Patent Literature 1: Rudolf-Andreas Probst, "With the optional 'Intelligent Emergency Call', BMW Motorrad is offering a motorcycle eCall system for the first time. Fast help in the case of an accident or an emergency situation.", [online], May 30, 2016, BMW Group, [Search Date: Nov. 9, 2016], Internet: <URL:https://www.press.bmwgroup.com/global/article/detail/T0259550EN/>
Patent Literature
Patent Literature 1: Japanese Patent Application Publication No. 2001-184580

SUMMARY OF INVENTION

Therefore, an object of the present invention is to provide, in a leaning vehicle, a novel function switch capable of being combined with a function switch that has been conventionally proposed.

The inventors of the present application conducted studies directed towards providing, in a leaning vehicle, a novel function switch capable of being combined with a function switch that has been conventionally proposed.

The inventors of the present application carried out analyses and studies regarding the circumstances when the state of a leaning vehicle changes from a traveling state to an overturned state. As a result, the present inventors found that, when the state of a leaning vehicle has changed to an overturned state, there are cases where the rider wishes to notify of the occurrence of overturning to an external party and there are cases where a rider does not wish to notify of the occurrence of overturning to an external party. For example, there are also cases where a rider wishes to cancel a notification of the occurrence of overturning that be made, or wishes to cancel the notification of the occurrence of overturning that has already been made, and to continue travelling on the leaning vehicle. Hereinafter, cancelling a notification of the occurrence of overturning to be made and cancelling the notification of the occurrence of overturning that has already been made are referred to collectively as "cancel notification of the occurrence of overturning".

According to the studies conducted regarding the circumstances when leaning vehicles overturn, it was found that there are many cases in which the right side face or left side face of the leaning vehicle is positioned on the bottom. Therefore, upon conducting detailed studies regarding leaning vehicles in an overturned state, the inventors of the present application noticed that the front face, rear face, top surface and undersurface in the leaning vehicle in an upright state can be seen by the rider in the leaning vehicle in an overturned state. Thus, the inventors of the present application noticed that it suffices to arrange a cancel switch or the cover of a cancel switch at a position that the rider can visually recognize from one or more horizontal directions in the leaning vehicle in an overturned state. By this means, the rider can cancel notification of the occurrence of overturning.

To solve the problem described above, the present invention adopts the following configurations.

(1) A leaning vehicle in which a leaning-vehicle-overturn-notification-system that notifies of overturn occurrence information indicating that the leaning vehicle changed from a travelling state to an overturned state to outside of the leaning vehicle by radio communication is applied, the leaning vehicle including:
  a vehicle body that leans to the left when turning left and leans to the right when turning right,
  a steerable wheel,
  a handle that steers the steerable wheel to cause the vehicle body to lean, and
  a first cancel switch for cancelling notification to be made by the leaning-vehicle-overturn-notification-system of the overturn occurrence information to outside of the leaning vehicle by the radio communication, or for cancelling notification that has been made by the leaning-vehicle-overturn-notification-system of the overturn occurrence information to outside of the leaning vehicle by the radio communication;
  wherein:
  the handle includes a right handle grip, a left handle grip, one or more right switch boxes that are disposed further rightward than a center in a left-right direction of the leaning vehicle in an upright state and to the left of the right handle grip, and one or more left switch boxes that are disposed further leftward than the center in the left-right direction of the leaning vehicle in an upright state and to the right of the left handle grip, the one or more right switch boxes are arranged in a row in a leftward direction from a left end of the right handle grip, the one or more left switch boxes are arranged in a row in a rightward direction from a right end of the left handle grip, and the leaning vehicle satisfies (A) or (B):

(A) the first cancel switch is, in the leaning vehicle in an upright state, disposed in a center region that is located between a plane perpendicular to the left-right direction that includes a left end of a right switch box that is disposed furthest to the left among the one or more right switch boxes, and a plane perpendicular to the left-right direction that includes a right end of a left switch box that is disposed furthest to the right among the one or more left switch boxes, and the first cancel switch is disposed at a position that is visible in one or more horizontal directions in the leaning vehicle in an overturned state;

(B) the leaning vehicle further includes:

a first cancel switch cover that covers the first cancel switch, wherein:

the first cancel switch cover is, in the leaning vehicle in an upright state, disposed in a center region that is located between a plane perpendicular to the left-right direction that includes a left end of a right switch box that is disposed furthest to the left among the one or more right switch boxes, and a plane perpendicular to the left-right direction that includes a right end of a left switch box that is disposed furthest to the right among the one or more left switch boxes, and the first cancel switch cover is disposed at a position that is visible in one or more horizontal directions in the leaning vehicle in an overturned state.

According to the leaning vehicle of (1), in the leaning vehicle in an overturned state, there is a high probability that the rider can quickly operate the first cancel switch. There is a high probability that the posture of a leaning vehicle in an overturned state will be such that the right side face or left side face thereof is directed downward. On the other hand, when a leaning vehicle overturns, there is a high probability that the rider will be on the ground. At this time, the rider could visually recognize the front face, rear face, top surface or undersurface of the leaning vehicle if the leaning vehicle is in an upright state.

In other words, the front face, rear face, top surface and undersurface of the leaning vehicle in an upright state are visible in one or more horizontal directions in the leaning vehicle in an overturned state.

Thus, the first cancel switch is disposed at a position that is visible in one or more horizontal directions in the leaning vehicle in an overturned state. By this means, there is a high probability that the rider can quickly recognize the position of the first cancel switch when the leaning vehicle overturns.

However, if the first cancel switch is disposed at a position for which there is a high probability that the first cancel switch will be concealed below the vehicle body in the leaning vehicle in an overturned state, there may be cases where it is difficult for the rider to operate the first cancel switch. Therefore, in the leaning vehicle, the first cancel switch is disposed within a center region. The term "center region" refers to a region in the vicinity of the center in the left-right direction in the leaning vehicle in an upright state. The center region is a region for which the probability of being concealed below the vehicle body when the leaning vehicle is in an overturned state is low. By this means, there is a high probability that it will be possible for the rider to operate the first cancel switch in the leaning vehicle in an overturned state. Furthermore, for the same reason, there is a high probability that it will also be possible for a third party present in the area around the leaning vehicle to operate the first cancel switch in the leaning vehicle in an overturned state.

In addition, according to the leaning vehicle of (1), it is possible to combine a cancel switch that has been conventionally proposed with the first cancel switch. More specifically, a conventionally proposed cancel switch is, for example, as described in Non Patent Literature 1, disposed in a right switch box. That is, the cancel switch that has been conventionally proposed is disposed outside of the center region. Therefore, the first cancel switch and the conventionally proposed cancel switch are disposed at different positions. Hence, it is possible to combine the first cancel switch and the conventionally proposed cancel switch. Note that, the leaning vehicle according to (1) may include or not include the cancel switch that has been conventionally proposed.

(2) The leaning vehicle according to (1), further including:

a second cancel switch, wherein the leaning vehicle satisfies (C) or (D):

(C) the second cancel switch is disposed within the center region and is disposed at a position that is not visible in one or more horizontal directions in the leaning vehicle in an overturned state, the second cancel switch is disposed outside the center region and is disposed at a position that is visible in one or more horizontal directions in the leaning vehicle in an overturned state, or the second cancel switch is disposed outside the center region and is disposed at a position that is not visible in one or more horizontal directions in the leaning vehicle in an overturned state;

(D) the leaning vehicle further includes:

a second cancel switch cover that covers the second cancel switch, wherein:

the second cancel switch cover is disposed within the center region and is disposed at a position that is not visible in one or more horizontal directions in the leaning vehicle in an overturned state, the second cancel switch cover is disposed outside the center region and is disposed at a position that is visible in one or more horizontal directions in the leaning vehicle in an overturned state, or the second cancel switch cover is disposed outside the center region and is disposed at a position that is not visible in one or more horizontal directions in the leaning vehicle in an overturned state.

According to the leaning vehicle of (2), the second cancel switch is disposed in a manner that is different from the manner in which the first cancel switch is disposed. Hence, the rider can recognize the second cancel switch in a situation which is different from a situation in which the rider can recognize the first cancel switch. For example, when the rider cannot recognize the first cancel switch, there is a possibility that the rider can recognize the second cancel switch. Further, when the rider cannot recognize the second cancel switch, there is a possibility that the rider can recognize the first cancel switch. Therefore, the probability that the rider can recognize the first cancel switch or the second cancel switch increases. For the same reason, the probability that a third party present in the area around the leaning vehicle can recognize the first cancel switch or the second cancel switch increases.

(3) The leaning vehicle according to (1), wherein:
the first cancel switch has an operation surface which a rider touches when operating the first cancel switch, and
the operation surface is directed in a horizontal direction in the leaning vehicle in an overturned state.

According to the leaning vehicle of (3), since the rider can operate the first cancel switch in a horizontal direction, the rider can easily operate the first cancel switch. Further, since a third party present in the area around the leaning vehicle can operate the first cancel switch in a horizontal direction, the third party can easily operate the first cancel switch.

(4) The leaning vehicle according to (1), further including:
an electrical parts assembly with the first cancel switch that can be detachably attached to the vehicle body in a state in which a plurality of parts including the first cancel switch and at least one electrical part that is different from the first cancel switch are combined;
wherein at least one portion of the electrical parts assembly with the first cancel switch is disposed within the center region that, in the leaning vehicle in an upright state, is located between a plane perpendicular to the left-right direction that includes a left end of a right switch box and a plane perpendicular to the left-right direction that includes a right end of a left switch box.

According to the leaning vehicle of (4), the routing of electrical wiring is simplified. More specifically, the first cancel switch is combined with an electrical part to constitute an electrical parts assembly. By this means, it is possible to provide the electrical wiring of the first cancel switch in the electrical wiring of the electrical parts assembly. Accordingly, the leaning vehicle need not include electrical wiring of the first cancel switch that is separate from the electrical wiring of the electrical parts assembly. As a result, according to the leaning vehicle of (4), the routing of the electrical wiring is simplified.

(5) The leaning vehicle according to (4), wherein:
the electrical part is a lighting device, a horn, a meter, a sensor, a key cylinder or a switch of a smart key system.

A lighting device, a horn, a meter, a sensor, a key cylinder or a switch of a smart key system is an electrical part that already exists in leaning vehicles. Therefore, it is possible for the leaning vehicle of (5) to include the first cancel switch by utilizing an existing electrical parts assembly.

(6) The leaning vehicle according to (1), further including:
a vehicle body cover that covers a portion of the vehicle body;
wherein the first cancel switch is disposed on a face that faces the vehicle body in the vehicle body cover.

A face that faces a vehicle body in a vehicle body cover is a location which a rider and a third party present in an area around a leaning vehicle normally have few opportunities to touch. Therefore, according to the leaning vehicle of (6), the occurrence of a situation in which the rider or a third party present in the area around the leaning vehicle needlessly operate the first cancel switch is suppressed.

(7) The leaning vehicle according to (1), wherein:
a color of the first cancel switch or the first cancel switch cover is different from a color of a member located in an area around the first cancel switch.

According to the leaning vehicle of (7), the rider and a third party present in the area around the leaning vehicle can recognize the first cancel switch or the first cancel switch cover by means of the color thereof.

(8) The leaning vehicle according to (7), wherein:
a color of the first cancel switch is different from a color of a member located in an area around the first cancel switch, and
the first cancel switch cover is transparent.

According to the leaning vehicle of (8), because the first cancel switch cover is transparent, the rider and a third party present in the area around the leaning vehicle can visually recognize the first cancel switch even in a state in which the first cancel switch cover is closed.

(9) The leaning vehicle according to (1), further including:
an alarm section that radiates a light or generates a sound when the leaning vehicle overturns,
wherein the alarm section and the first cancel switch are disposed at positions that are simultaneously visible in the leaning vehicle in an overturned state.

According to the leaning vehicle of (9), there is a higher probability that the rider can recognize the first cancel switch. More specifically, when the alarm section radiates a light or generates a sound, the attention of the rider is drawn to the alarm section. Therefore, the alarm section and the first cancel switch are disposed at positions that can be visually recognized simultaneously when the leaning vehicle in an overturned state. Thus, there is a higher probability that the rider can recognize the first cancel switch. For the same reason, there is a higher probability that a third party present in the area around the leaning vehicle can recognize the first cancel switch.

(10) The leaning vehicle according to (9), wherein:
in the leaning vehicle in an overturned state, the alarm section and the first cancel switch are visually recognized simultaneously by a rider who operates the first cancel switch.

According to the leaning vehicle of (10), based on the leaning vehicle of (9), the first cancel switch is disposed close to the alarm section. Therefore, there is an even higher probability that the rider can recognize the first cancel switch. For the same reason, there is an even higher probability that a third party present in the area around the leaning vehicle can recognize the first cancel switch.

The aforementioned objects and other objects, features, aspects and advantages of the present invention will become more apparent from the following detailed description of embodiments of the invention that are described in association with the attached drawings.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components and/or groups thereof.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the invention, it will be understood that a number of techniques and steps are disclosed. Each of these have individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for the purpose of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

ADVANTAGEOUS EFFECTS OF INVENTION

According to the present invention, when a leaning vehicle is in an overturned state, a rider can visually recognize a cancel switch or a cover of a cancel switch in one or more horizontal directions.

BRIEF DESCRIPTION OF THE DRAWINGS

FIG. 4 is a left side view of the leaning vehicle 2.

FIG. 14 is a left side view of a leaning vehicle 2a.

DETAILED DESCRIPTION

[Configuration of Leaning-Vehicle-Overturn-Notification-System]

Figure 1:
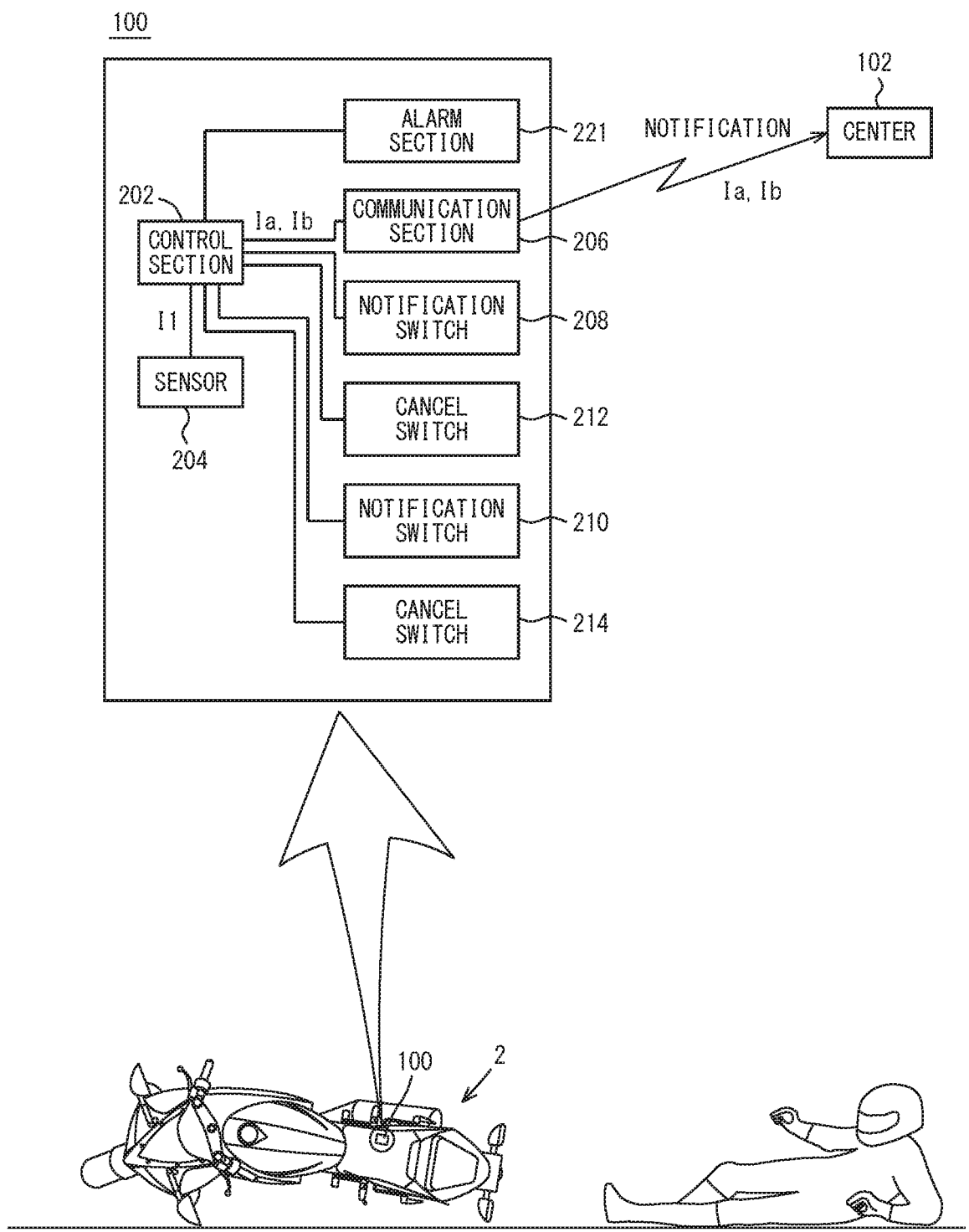
FIG. 1 shows a top view of a leaning vehicle 2 and a block diagram of a leaning-vehicle-overturn-notification-system 100.
Figure 2:
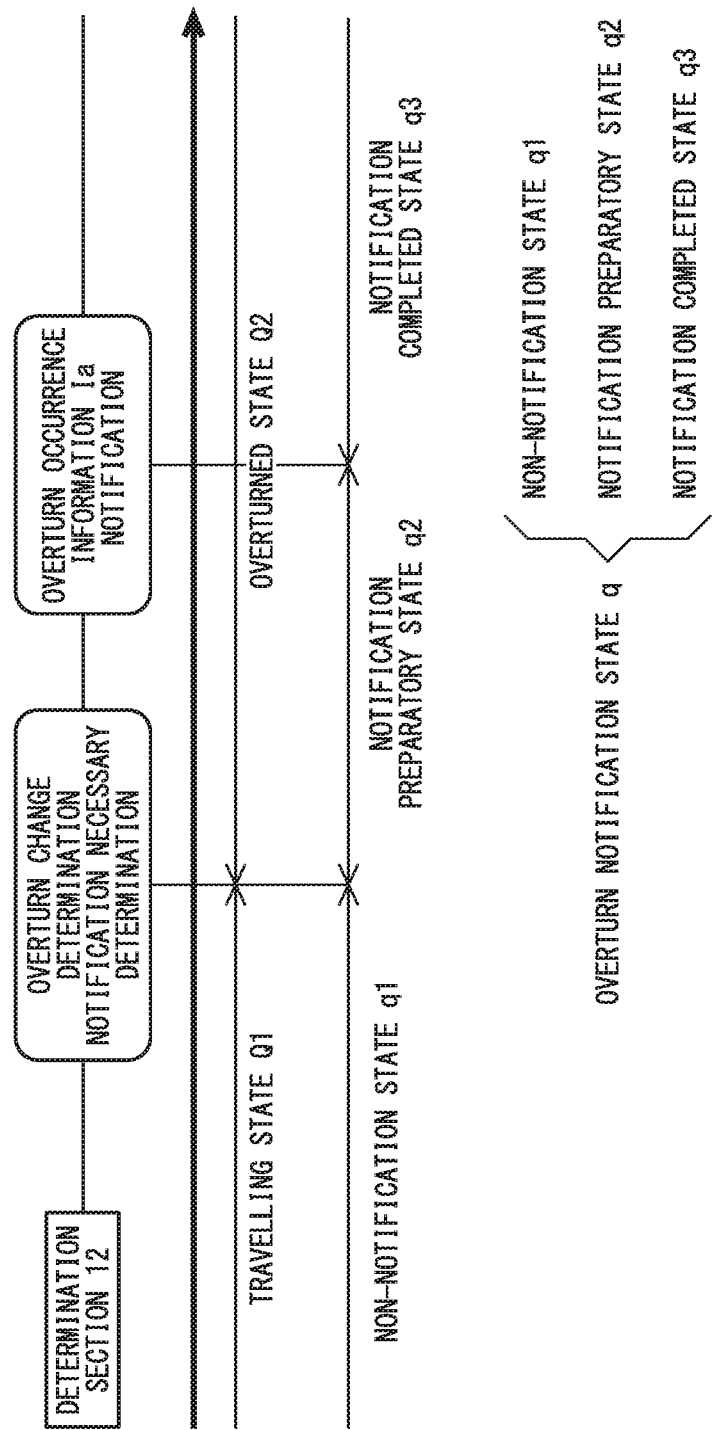
FIG. 2 is a state transition diagram of the leaning-vehicle-overturn-notification-system 100.

First, a leaning-vehicle-overturn-notification-system 100 mounted in a leaning vehicle 2 will be described while referring mainly to FIG. 1. FIG. 1 shows a top view of the leaning vehicle 2, and a block diagram of the leaning-vehicle-overturn-notification-system 100. FIG. 2 is a state transition diagram of the leaning-vehicle-overturn-notification-system 100.

The leaning vehicle 2 is a vehicle that leans into turns. The leaning vehicle 2 is not particularly limited, and is, for example, a straddled vehicle such as a motorcycle or a motor tricycle. Hereinafter, the term "frontward direction" refers to the direction of travel of the leaning vehicle 2 in an upright state. The term "backward direction" refers to the opposite direction to the direction of travel of the leaning vehicle 2 in an upright state. The terms "rightward direction" and "leftward direction" refer to the rightward direction and the leftward direction, respectively, when taking a rider who straddles the leaning vehicle 2 in an upright state as a reference. The terms "upward direction" and "downward direction" refer to the upward direction and the downward direction, respectively, when taking a rider who straddles the leaning vehicle 2 in an upright state as a reference.

The leaning vehicle 2 includes the leaning-vehicle-overturn-notification-system 100. The leaning-vehicle-overturn-notification-system 100 is a system that notifies of overturn occurrence information Ia which indicates that the leaning vehicle 2 changed from a travelling state Q1 (see FIG. 2) to an overturned state Q2 (see FIG. 2) to outside of the leaning vehicle 2 by radio communication. The term "outside of the leaning vehicle 2" is not particularly limited, and for example, refers to a center 102. The center 102 dispatches assistance to the rider of the leaning vehicle 2 based on the overturn occurrence information Ia. Hereinafter, a state of notification of the overturn occurrence information Ia is referred to as an "overturn notification state q" (see FIG. 2). A non-notification state q1 (see FIG. 2), a notification preparatory state q2 (see FIG. 2), and a notification completed state q3 (see FIG. 2) that are described later exist in the overturn notification state q.

The leaning-vehicle-overturn-notification-system 100 includes a control section 202, a sensor 204, a communication section 206, notification switches 208 and 210, cancel switches 212 and 214 and an alarm section 221. The sensor 204 acquires determination base information I1 that is used for making an overturn determination and a notification determination at the control section 202 as described later. The overturn determination is a determination as to whether or not the leaning vehicle 2 changed from the travelling state Q1 to the overturned state Q2. The notification determination is a determination that, in a case where the leaning vehicle 2 changed from the travelling state Q1 to the overturned state Q2, determines whether or not it is necessary to notify the overturn occurrence information Ia to the center 102 by radio communication. The sensor 204 is not particularly limited, and for example is a speed sensor and a leaning determination sensor. The speed sensor measures the speed of the leaning vehicle 2. The leaning determination sensor is a sensor that outputs a leaning determination result that shows whether or not, when the leaning vehicle 2 is viewed from the frontward area, an angle (leaning angle) that is formed by a center line of the leaning vehicle 2 and the vertical direction is greater than a prescribed value. The prescribed value is a value that is defined according to the respective methods for determining an overturn which are described later, and therefore is a value that differs for each overturn determination method. Hence, the determination base information I1 is, for example, the speed of the leaning vehicle 2 and a leaning determination result. Note that, the sensor 204 may include a sensor other than a speed sensor and a leaning determination sensor. A sensor other than a speed sensor and a leaning determination sensor is not particularly limited, and for example is an acceleration sensor. An acceleration sensor measures the acceleration of the leaning vehicle 2. In this case the acceleration is also included in the determination base information I1.

The control section 202 determines whether or not the leaning vehicle 2 changed from the travelling state Q1 to the overturned state Q2, based on the determination base information I1 that is output thereto from the sensor 204 (overturn determination). In addition, based on the determination base information I1 that is output thereto from the sensor 204, the control section 202 determines whether or not it is necessary to notify the overturn occurrence information Ia to the center 102 by radio communication (notification determination). Even in a case where the leaning vehicle 2 changed from the travelling state Q1 to the overturned state Q2, in some cases, for reasons such as the impact of overturning being small, it is not necessary for the leaning-vehicle-overturn-notification-system 100 to notify of the overturn occurrence information Ia to the center 102. Therefore, the control section 202 performs the notification determination after the overturn determination. In the notification determination, the control section 202, for example, determines the size of the impact of overturning based on the speed of the leaning vehicle 2 that the sensor 204 measured. If the impact of overturning is relatively large, the control section 202 determines that notification of the overturn occurrence information Ia is necessary. If the impact of overturning is relatively small, the control section 202 determines that notification of the overturn occurrence information Ia is unnecessary. Various determination methods that are already known can be applied as the methods used to perform the overturn determination and the notification determination. Further, novel determination methods that are not publicly known may be applied as the methods used to perform the overturn determination and the notification determination. A definition of the travelling state Q1 and a definition of the overturned state Q2 are not particularly limited, and the definitions differ depending on the overturn determination method. Further, the conditions for determining that notification of the overturn occurrence information Ia is necessary are also not particularly limited, and the conditions differ depending on the notification determination method. Furthermore, the overturn occurrence information Ia is not notified of in the travelling state Q1. The overturn notification state q in which the overturn occurrence information Ia is not notified of is referred to as "non-notification state q1" (see FIG. 2).

In a case where the control section 202 determines that the leaning vehicle 2 changed from the travelling state Q1 to the overturned state Q2 and also determines that notification of the overturn occurrence information Ia is necessary, the control section 202 conducts preparations for notifying of the overturn occurrence information Ia to the center 102. Hereunder, a fact that the control section 202 determines that the leaning vehicle 2 changed from the travelling state Q1 to the overturned state Q2 is referred to as an "overturn change determination". Further, a fact that the control section 202 determines that notification of the overturn occurrence information Ia is necessary is referred to as a "notification necessary determination". In a case where the control section 202 made an overturn change determination and a notification necessary determination, the control section 202 waits for a predetermined time period Ta (for example, 30 seconds) from the time of making the notification necessary determination before outputting the overturn occurrence information Ia to the communication section 206 that is described later. An overturn notification state q in which the control section 202 is waiting before outputting the overturn occurrence information Ia is referred to as "notification preparatory state q2" (see FIG. 2).

On the other hand, when the predetermined time period Ta passes after making the notification necessary determination, the control section 202 outputs the overturn occurrence information Ia to the communication section 206 that is described later. When the communication section 206 receives the overturn occurrence information Ia that was output from the control section 202, the communication section 206 transmits the overturn occurrence information Ia to the center 102. Hereinafter, an overturn notification state q in which the overturn occurrence information Ia has been notified of is referred to as "notification completed state q3" (see FIG. 2)

The alarm section 221 is a section that, by radiating a light or generating a sound when the leaning vehicle 2 has overturned, notifies people in the area around the leaning vehicle 2 that the leaning vehicle 2 has overturned. The alarm section 221 is, for example, a front light, a tail light, a license plate light, indicators and a horn. The front light, tail light, license plate light and indicators flash or light up when the leaning vehicle 2 has overturned. The horn emits a sound continuously or intermittently when the leaning vehicle 2 has overturned.

The notification switches 208 and 210 are function switches for causing the leaning-vehicle-overturn-notification-system 100 to notify of the overturn occurrence information Ia to the center 102 when operated by the rider or a third party. When the notification switches 208 and 210 are operated by the rider or a third party, even if the control section 202 has not made an overturn change determination and a notification necessary determination, the leaning-vehicle-overturn-notification-system 100 notifies of the overturn occurrence information Ia to the center 102. The notification switch 208 and the notification switch 210 are disposed at different positions from each other in the leaning vehicle 2.

The cancel switches 212 and 214 are function switches for cancelling the preparation by the leaning-vehicle-overturn-notification-system 100 for notifying of the overturn occurrence information Ia to the center 102 when operated by the rider or a third party present in the area around the leaning vehicle 2. Specifically, even when in the notification preparatory state q2, there are times when the rider does not want the leaning-vehicle-overturn-notification-system 100 to notify of the overturn occurrence information Ia to the center 102. Therefore, before outputting the overturn occurrence information Ia to the communication section 206, the control section 202 waits for the predetermined time period Ta after making a notification necessary determination. If the cancel switch 212 or 214 is operated by the rider or a third party while the control section 202 is waiting to output the overturn occurrence information Ia, the control section 202 does not output the overturn occurrence information Ia to the communication section 206. That is, the leaning-vehicle-overturn-notification-system 100 cancels the preparation for notification of the overturn occurrence information Ia.

The cancel switches 212 and 214 are also function switches for cancelling notification of the overturn occurrence information Ia in a case where the leaning-vehicle-overturn-notification-system 100 notified of the overturn occurrence information Ia to the center 102. Specifically, even in the notification completed state q3, there are times when the rider wants to cancel the notification of the overturn occurrence information Ia that was notified to the center 102. Therefore, after the overturn occurrence information Ia has been notified of to the center 102, if the cancel switch 212 or 214 is operated by the rider or a third party, the control section 202 transmits notification cancellation information Ib to the center 102 through the communication section 206. That is, the leaning-vehicle-overturn-notification-system 100 cancels the notification of the overturn occurrence information Ia that was notified of. The cancel switch 212 and the cancel switch 214 are disposed at different positions from each other in the leaning vehicle 2.

[Operations of Leaning-Vehicle-Overturn-Notification-System]

Figure 3:
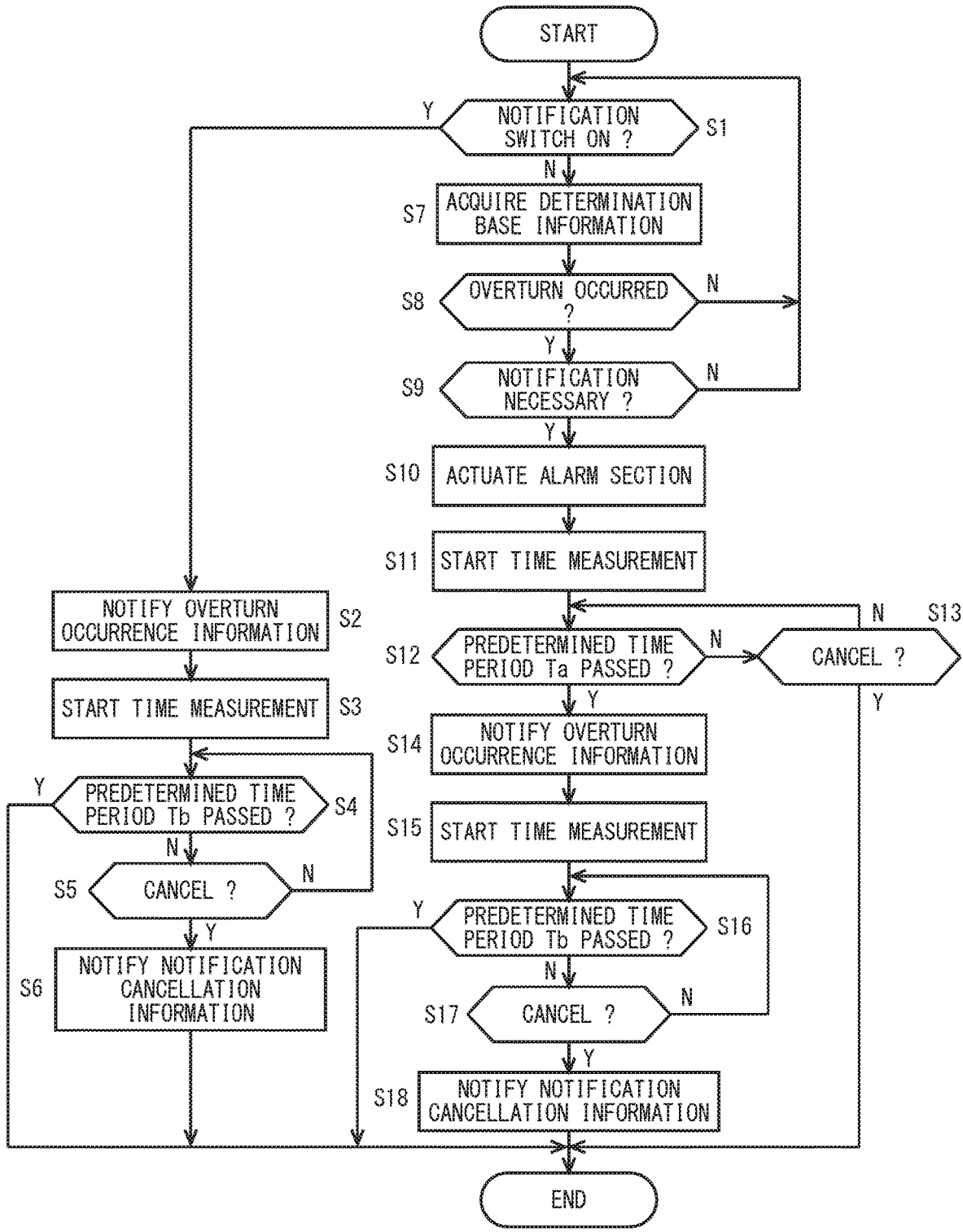
FIG. 3 is a flowchart of operations that a control section 202 executes.

Next, operations of the leaning-vehicle-overturn-notification-system 100 will be described referring to FIG. 3. FIG. 3 is a flowchart of operations that the control section 202 executes.

The present processing is started, for example, when an electric current is fed by an ignition power source of the leaning vehicle 2, and electric power is supplied to the leaning-vehicle-overturn-notification-system 100. The overturn notification state q when the present processing starts is the non-notification state q1.

First, the control section 202 determines whether or not the notification switch 208 or the notification switch 210 is switched on (step S1). If the notification switch 208 or the notification switch 210 is switched on (Yes), the present processing proceeds to step S2. If the notification switch 208 and the notification switch 210 are not switched on (No), the present processing proceeds to step S7.

In a case where the notification switch 208 or the notification switch 210 is switched on (Yes in step S1), the control section 202 notifies of the overturn occurrence information Ia to the center 102 through the communication section 206 (step S2). As a result, the overturn notification state q changes from the non-notification state q1 to the notification completed state q3. In addition, the control section 202 starts measurement of a predetermined time period Tb (for example, 5 minutes) (step S3). Hereunder, the reason for measuring the predetermined time period Tb will be described. Even in a case where the leaning-vehicle-overturn-notification-system 100 notified of the overturn occurrence information Ia to the center 102, there are times when the rider wishes to cancel the notification of the overturn occurrence information Ia that was notified of by the leaning-vehicle-overturn-notification-system 100 to the center 102. Therefore, until the predetermined time period Tb passes from step S3, by switching on the cancel switch 212 or the cancel switch 214, the rider can cancel the notification of the overturn occurrence information Ia that was notified of by the leaning-vehicle-overturn-notification-system 100 to the center 102. On the other hand, after the predetermined time period Tb passes from step S3, even if the rider switches on the cancel switch 212 or the cancel switch 214, notification of the overturn occurrence information Ia that was notified of to the center 102 by the leaning-vehicle-overturn-notification-system 100 is not cancelled. At such time, assistance is dispatched to the rider.

Next, the control section 202 determines whether or not the predetermined time period Tb has elapsed from step S3 (step S4). If the predetermined time period Tb elapsed (Yes), the present processing ends. In this case, the center 102 dispatches assistance to the rider. If the predetermined time period Tb has not elapsed (No), the present processing proceeds to step S5.

If the predetermined time period Tb has not elapsed (No in step S4), the control section 202 determines whether or not the cancel switch 212 or the cancel switch 214 has been switched on (step S5). If the cancel switch 212 or the cancel switch 214 has been switched on (Yes), the present processing proceeds to step S6. If the cancel switch 212 and the cancel switch 214 have not been switched on (No), the present processing returns to step S4.

If the cancel switch 212 or the cancel switch 214 has been switched on (Yes in step S5), the control section 202 notifies of the notification cancellation information Ib (see FIG. 1) to the center 102 through the communication section 206 (step S6). By this means, the notification of the overturn occurrence information Ia that was notified of to the center 102 by the leaning-vehicle-overturn-notification-system 100 is cancelled. Thereafter, the present processing ends.

In a case where the notification switch 208 and the notification switch 210 have not been switched on (No in step S1), the control section 202 acquires the determination base information I1 from the sensor 204 (step S7). Based on the determination base information I1, the control section 202 determines whether or not the leaning vehicle 2 changed from the travelling state Q1 to the overturned state Q2 (step S8; overturn determination). If the leaning vehicle 2 changed to the overturned state Q2 (Yes), the present processing proceeds to step S9. If the leaning vehicle 2 has not changed to the overturned state Q2 (No), the present processing returns to step S1.

In a case where the leaning vehicle 2 changed to the overturned state Q2 (Yes in step S8), the control section 202 determines whether or not it is necessary for the leaning-vehicle-overturn-notification-system 100 to notify of the overturn occurrence information Ia to the center 102 (step S9; notification determination). In step S9, for example, the control section 202 determines the size of the impact of overturning. In a case where the impact of overturning is relatively large, the control section 202 determines that notification of the overturn occurrence information Ia is necessary (Yes). The overturn notification state q changes from the non-notification state q1 to the notification preparatory state q2. In this case, the present processing proceeds to step S10. In a case where the impact of overturning is relatively small, the control section 202 determines that notification of the overturn occurrence information Ia is unnecessary (No). In this case, the present processing returns to step S1.

In a case where notification is necessary (Yes in step S9), the control section 202 activates the alarm section 221 (step S10). For example, the control section 202 causes the front light, tail light, license plate lamp or indicators to flash, and also causes the horn to generate a sound. In addition, the control section 202 starts measurement of a predetermined time period Ta (for example, 30 seconds) (step S11). The control section 202 then determines whether or not the predetermined time period Ta has passed from step S11 (step S12). If the predetermined time period Ta has not passed (No), the present processing proceeds to step S13. If the predetermined time period Ta has passed (Yes), the present processing proceeds to step S14.

If the predetermined time period Ta has not passed (No in step S12), the control section 202 determines whether or not the cancel switch 212 or the cancel switch 214 has been switched on (step S13). If the cancel switch 212 or the cancel switch 214 has been switched on (Yes), the preparation being performed by the leaning-vehicle-overturn-notification-system 100 for notifying of the overturn occurrence information Ia to the center 102 is cancelled. That is, the overturn occurrence information Ia is not notified of to the center 102. Thereafter, the present processing ends. If the cancel switch 212 and the cancel switch 214 have not been switched on (No), the present processing returns to step S12.

If the predetermined time period Ta has passed (Yes in step S12), the control section 202 notifies of the overturn occurrence information Ia to the center 102 through the communication section 206 (step S14). The overturn notification state q changes from the notification preparatory state q2 to the notification completed state q3.

Next, the control section 202 starts measurement of the predetermined time period Tb (step S15). The control section 202 then determines whether or not the predetermined time period Tb has passed from the time of step S15 (step S16). If the predetermined time period Tb has passed (Yes), the present processing ends. In this case, the center 102 dispatches assistance to the rider. If the predetermined time period Tb has not passed (No), the present processing proceeds to step S17.

If the predetermined time period Tb has not passed (No in step S16), the control section 202 determines whether or not the cancel switch 212 or the cancel switch 214 has been switched on (step S17). If the cancel switch 212 or the cancel switch 214 has been switched on (Yes), the present processing proceeds to step S18. If the cancel switch 212 and the cancel switch 214 have not been switched on (No), the present processing returns to step S16.

If the cancel switch 212 or the cancel switch 214 has been switched on (Yes in step S17), the control section 202 notifies of the notification cancellation information Ib to the center 102 through the communication section 206 (step S18). By this means, notification of the overturn occurrence information Ia that was notified of to the center 102 by the leaning-vehicle-overturn-notification-system 100 is cancelled. Thereafter, the present processing ends.

First Embodiment

[Overall Configuration]

Figure 5:
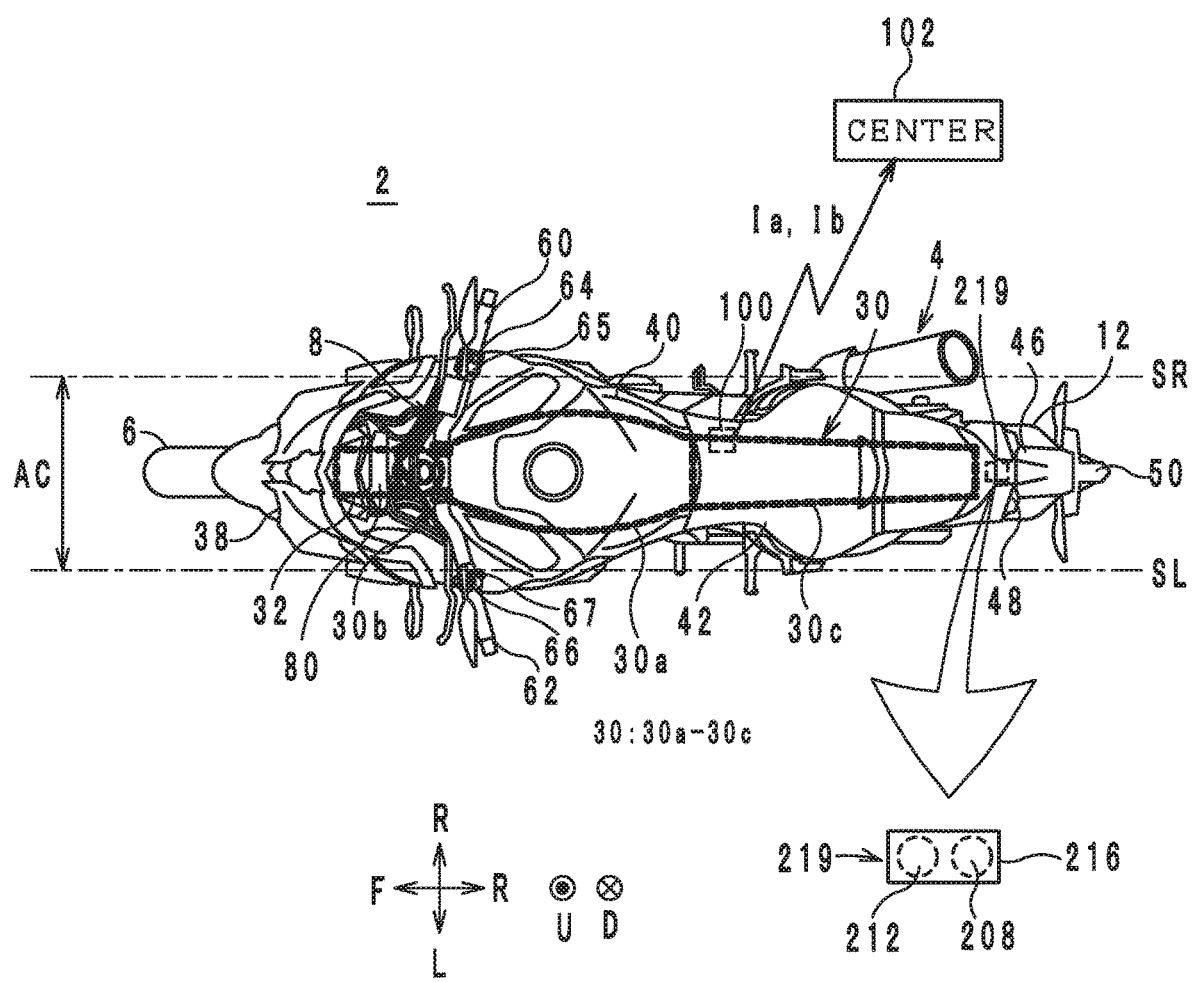
FIG. 5 is a top view of the leaning vehicle 2.

Next, the overall configuration of the leaning vehicle 2 according to the first embodiment will be described referring mainly to FIG. 4. FIG. 4 is a left side view of the leaning vehicle 2. FIG. 5 is a top view of the leaning vehicle 2.

In this specification, the term "a first member is disposed further forward than a second member" indicates the following state. That is, the first member is disposed in front of a plane orthogonal to the front-back direction which passes through the front end of the second member. In this case, the first member and the second member may or may not be aligned in the front-back direction. This definition also applies to directions other than the front-back direction.

In this specification, the term "a first member is disposed in front of a second member" indicates the following state. That is, at least one part of the first member is disposed within a region that the second member will pass through if the second member translates in the frontward direction. Hence, the entire first member may fit within a region that the second member will pass through if the second member translates in the frontward direction, or the first member may protrude from a region that the second member will pass through if the second member translates in the frontward direction. In this case, the first member and the second member are aligned in the front-back direction. This definition also applies to directions other than the front-back direction.

Hereinafter, the term "upper portion" of a component means the portion of the component that is located above the center of the component in the up-down direction. The term "lower portion" of a component means the portion of the component that is located below the center of the component in the up-down direction. The term "front portion" of a component means the portion of the component that is located in front of the center of the component in the front-back direction. The term "back portion" of a component means the portion of the component that is located behind the center of the component in the front-back direction. The term "right portion" of a component means the portion of the component that is located to the right of the center of the component in the left-right direction. The term "left portion" of a component means the portion of the component that is located to the left of the center of the component in the left-right direction. The term "top end" of a component means the end of the component in the upward direction. The term "bottom end" of a component means the end of the component in the downward direction. The term "front end" of a component means the end of the component in the frontward direction. The term "back end" of a component means the end of the component in the backward direction. The term "right end" of a component means the end of the component in the rightward direction. The term "left end" of a component means the end of the component in the leftward direction. The term "top end portion" of a component means the top end and the vicinity of the top end of the component. The term "bottom end portion" of a component means the bottom end and the vicinity of the bottom end of the component. The term "front end portion" of a component means the front end and the vicinity of the front end of the component. The term "back end portion" of a component means the back end and the vicinity of the back end of the component. The term "right end portion" of a component means the right end and the vicinity of the right end of the component. The term "left end portion" of a component means the left end and the vicinity of the left end of the component. The term "component" means the leaning vehicle 2 and a member constituting a part of the leaning vehicle 2.

The leaning vehicle 2 is a naked-type motorcycle. The leaning vehicle 2 includes the vehicle body 4, a steerable wheel 6, a handle 8, a steering shaft 9, a front fork 10, a drive wheel 12, a power unit 34, a power unit 34, a swing arm 36, a front light unit 38, a tank 40, a seat 42, a rear fender 46, a tail light unit 48, a license plate light unit 50, a meter unit 80 (see FIG. 5) and a switch unit 219. The vehicle body 4 leans to the left when the leaning vehicle 2 turns left, and leans to the right when the leaning vehicle 2 turns right. The vehicle body 4 includes a frame 30 and a stay 32.

The frame 30 includes a main frame 30a, a head pipe 30b and a seat rail 30c. The head pipe 30b has a cylindrical shape. In the leaning vehicle 2 in an upright state, the central axis of the head pipe 30b inclines slightly relative to the vertical direction so that the top end of the central axis of the head pipe 30b is located further backward than the bottom end of the central axis of the head pipe 30b. The main frame 30a is connected to the head pipe 30b. The main frame 30a extends in the backward direction from the head pipe 30b. Further, the main frame 30a bends in the downward direction at the back end portion of the main frame 30a. The seat rail 30c is connected to the main frame 30a. The seat rail 30c extends linearly rearward and upward from the portion at which the main frame 30a bends.

A stay 32 is attached to the head pipe 30b. The stay 32 is disposed in front of the head pipe 30b. Hereinafter, the term "attached" means that two components are integrated in a state in which the components can be separated without damage to the members.

The swing arm 36 is attached to the main frame 30a. The swing arm 36 extends in the rearward direction from the main frame 30a below the seat rail 30c. When the leaning vehicle 2 is viewed from the leftward area, the swing arm 36 can swing in the up-down direction around a connecting portion between the swing arm 36 and the main frame 30a. Note that, the swing arm 36 may be attached to the engine instead of being attached to the main frame 30a.

The steering shaft 9 is inserted into the head pipe 30b. The handle 8 is attached through a bracket to the top end portion of the steering shaft 9. The front fork 10 is attached through a bracket to the bottom end portion of the steering shaft 9.

The steerable wheel 6 is the front wheel of the leaning vehicle 2. The steerable wheel 6 is attached to the bottom end portion of the front fork 10 so as to be capable of rotating around an axle shaft. By this means, the rider can steer the steerable wheel 6 by operating the handle 8. Specifically, when the leaning vehicle 2 is viewed from an upward area, when the rider turns the handle 8 clockwise, the steerable wheel 6 is caused to turn clockwise. The vehicle body 4 leans to the right and the leaning vehicle 2 turns to the right. Further, when the leaning vehicle 2 is viewed from the upward area, when the rider turns the handle 8 counterclockwise, the steerable wheel 6 is caused to turn counterclockwise. The vehicle body 4 leans to the left, and the leaning vehicle 2 turns to the left.

The drive wheel 12 is the rear wheel of the leaning vehicle 2. The drive wheel 12 is attached to the back end portion of the swing arm 36 so as to be capable of rotating around the axle shaft.

The front light unit 38 is a lighting device that radiates light in front of the leaning vehicle 2. The front light unit 38 is attached to the stay 32. By this means, the front light unit 38 is disposed at the front end portion of the vehicle body 4.

The tank 40 stores fuel such as gasoline. The tank 40 is attached to the main frame 30a. The tank 40 is disposed at an upper portion of the vehicle body 4. The seat 42 is attached to the seat rail 30c. The seat 42 is disposed behind the tank 40 at the upper portion of the vehicle body 4.

The power unit 34 generates a driving force for running the leaning vehicle 2. The driving force which the power unit 34 generates is transmitted to the drive wheel 12. The power unit 34 is not particularly limited, and for example may be a combination of an engine and a transmission or may be a combination of a motor and a transmission. The power unit 34 is attached to the main frame 30a. The power unit 34 is disposed below the tank 40.

The tail light unit 48 is a lighting device that radiates light behind the leaning vehicle 2. The tail light unit 48 is attached through a bracket (not illustrated) to the back end portion of the seat rail 30c.

The rear fender 46 extends backward and downward from the vicinity of the back end portion of the seat rail 30c. A holding section 47 is provided in the vicinity of the bottom end portion of the rear fender 46. A license plate (not illustrated) is attached to the holding section 47.

The license plate light unit 50 is a lighting device that, by radiating light in the downward direction, illuminates the license plate attached to the holding section 47. The license plate light unit 50 extends in the backward direction from the vicinity of the center in the up-down direction of the rear fender 46.

As illustrated in FIG. 5, the meter unit 80 is a measuring instrument that displays information, such as the speed, toward the rider. The meter unit 80 is disposed in front of the handle 8 in the leaning vehicle 2.

[Handle and Meter Unit]

Figure 6:
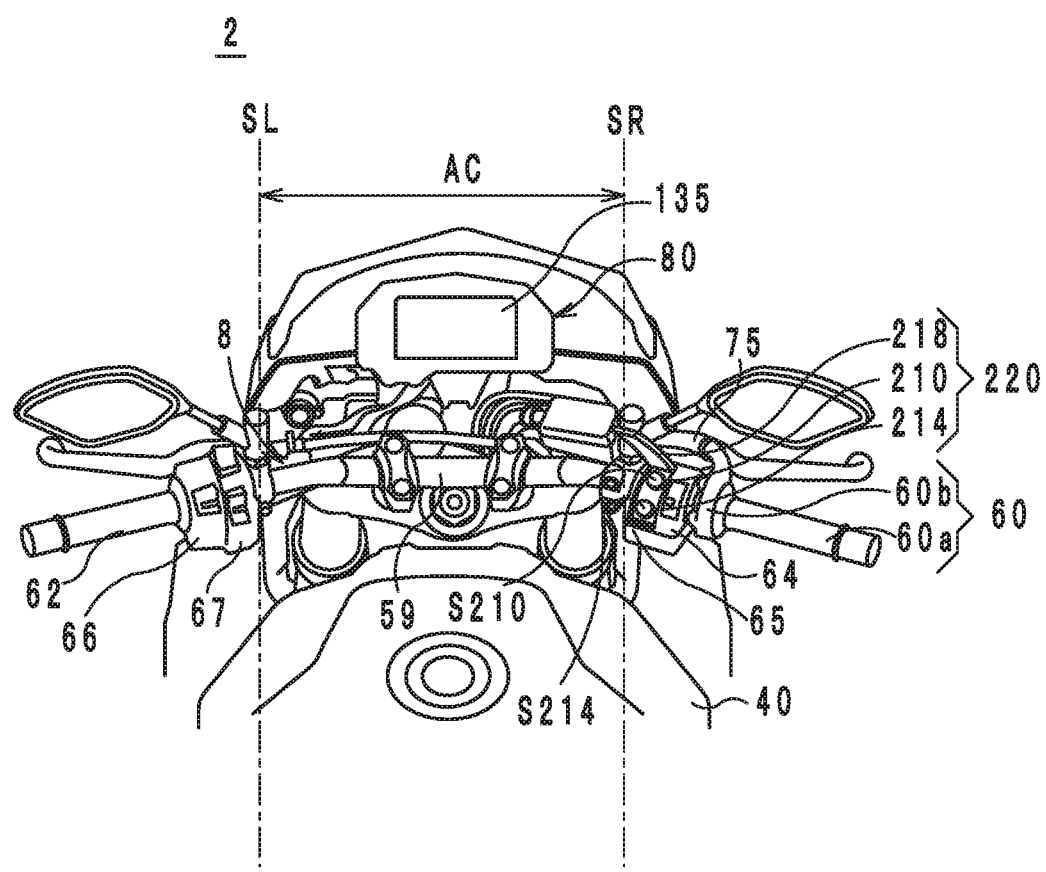
FIG. 6 is a perspective view of a handle 8 and a meter unit 80 as viewed from a rearward and upward area.

Next, the details of the handle 8 and the meter unit 80 will be described while referring to FIG. 6. FIG. 6 is a perspective view of the handle 8 and the meter unit 80 as viewed from a rearward and upward area.

The handle 8 includes a handlebar 59, a right handle grip 60, a left handle grip 62, right switch boxes 64 and 65, and left switch boxes 66 and 67. The handlebar 59 is a cylindrical member that extends in the left-right direction. However, the right portion of the handlebar 59 is drawn by a small amount in the upward and backward direction from the center in the left-right direction of the handlebar 59. Further, the left portion of the handlebar 59 is drawn by a small amount in the upward and backward direction from the center in the left-right direction of the handlebar 59.

The left handle grip 62 is a circular cylindrical member having a central axis that extends in the left-right direction. The left end portion of the handlebar 59 is inserted into the left handle grip 62 from an opening at the right end of the left handle grip 62. By this means, the left handle grip 62 is disposed at the left end portion of the handlebar 59. However, the left handle grip 62 is fixed to the handlebar 59, and cannot rotate with respect to the handlebar 59. The rider holds the left handle grip 62 with their left hand.

The left switch boxes 66 and 67 are attached to the handlebar 59. The left switch boxes 66 and 67 are disposed at positions that are located further leftward than the center in the left-right direction of the leaning vehicle 2 in an upright state, and to the right of the left handle grip 62. Specifically, the left switch box 66 is disposed to the right of the left handle grip 62 so as to be adjacent to the left handle grip 62. The left switch box 67 is disposed to the right of the left switch box 66 so as to be adjacent to the left switch box 66. Thus, the left switch boxes 66 and 67 are arranged in a row in the rightward direction from the right end of the left handle grip 62. In this specification, the term "adjacent" means that two components adjoin each other in a contacting or connected state. Further, in this specification, the term "in a row" means that two or more components are arranged in one row, and adjoining components among the two or more components are contacting or connected with each other.

Switches are disposed in the left switch boxes 66 and 67. The switches that are disposed in the left switch boxes 66 and 67 are not particularly limited, and for example are a passing light switch, a headlight up/down changeover switch, a direction indicator switch and a horn switch.

The right handle grip 60 includes a grip section 60*a* and a detection section 60*b*. The grip section 60*a* is a circular cylindrical member having a central axis that extends in the left-right direction. The right end portion of the handlebar 59 is inserted into the grip section 60*a* from an opening in the left end of the grip section 60*a*. Thus, the grip section 60*a* is disposed at the right end portion of the handlebar 59. In addition, the grip section 60*a* can rotate around the central axis of the handlebar 59.

The detection section 60*b* is disposed to the left of the grip section 60*a* so as to be adjacent to the grip section 60*a*. The detection section 60*b* includes a built-in sensor that detects a rotation angle from an initial position of the grip section 60*a*. The initial position of the grip section 60*a* is the position of the grip section 60*a* when the rider is not touching the grip section 60*a*. In addition, the detection section 60*b* outputs the detected angle as an electrical signal to an ECU (electric control unit; not illustrated) through electrical wiring 75. The ECU controls the output of the power unit 34 based on the electrical signal. That is, the rider can adjust the output of the power unit 34 by rotating the grip section 60*a* with their right hand.

Note that, the right handle grip 60 has been described by taking as an example the leaning vehicle 2 in which an electronic control throttle mechanism is applied. However, a mechanical control throttle mechanism may be applied in the leaning vehicle 2. In this case, the grip section 60*a* and the power unit 34 are mechanically connected through a cable. A first end of the cable is physically connected to the grip section 60*a* in the detection section 60*b*. A second end of the cable is physically connected to the power unit 34. The grip section 60*a* is positioned at the initial position when the rider is not touching the grip section 60*a*. In this case, the output of the power unit 34 is relatively small. Further, when the rider rotates the grip section 60*a* from the initial position, the cable is drawn towards the grip section 60*a* from the power unit 34. As a result, the output of the power unit 34 becomes relatively larger.

The right switch boxes 64 and 65 are attached to the handlebar 59. The right switch boxes 64 and 65 are disposed at positions that are located further rightward than the center in the left-right direction of the leaning vehicle 2 in an upright state, and to the left of the right handle grip 60. Specifically, the right switch box 64 is disposed to the left of the detection section 60*b* so as to be adjacent to the detection section 60*b*. The right switch box 65 is disposed to the left of the right switch box 64 so as to be adjacent to the right switch box 64. Thus, the right switch boxes 64 and 65 are arranged in a row in the leftward direction from the left end of the right handle grip 60.

A switch is disposed in the right switch box 64. The switch disposed in the right switch box 64 is not particularly limited, and for example is an engine stop switch or a starter switch.

Hereinafter, in the leaning vehicle 2 in an upright state, a plane perpendicular to the left-right direction that includes the left end of the right switch box 65 is defined as a "plane SR" (see FIG. 5 and FIG. 6). The right switch box 65 is the right switch box that is positioned furthest to the left among the right switch boxes 64 and 65. Further, a plane perpendicular to the left-right direction that includes the right end of the left switch box 67 is defined as a "plane SL" (see FIG. 5 and FIG. 6). The left switch box 67 is the left switch box that is positioned furthest to the right among the left switch boxes 66 and 67. In addition, the region located between the plane SR and the plane SL is defined as a "center region AC".

A switch unit 220 includes the notification switch 210, the cancel switch 214 (one example of a second cancel switch), and a switch cover 218 (one example of a second cancel switch cover) (see FIG. 6). The switch unit 220 is disposed in the right switch box 65. Hence, the switch unit 220 is disposed outside the center region AC. In this specification, the description "the switch unit 220 is disposed outside the center region AC" means that the entire switch unit 220 is disposed outside the center region AC. The notification switch 210 and the cancel switch 214 are aligned in that order from the up to the down on the back surface of the right switch box 65. The notification switch 210 and the cancel switch 214 are not particularly limited, and, for example, are push buttons. Therefore, the notification switch 210 and the cancel switch 214 have operation surfaces S210 and S214, respectively, that the rider touches when operating the notification switch 210 and the cancel switch 214. The characters "CALL" are written on the operation surface S210. The characters "CANCEL" or "STOP" are written on the operation surface S214. The operation surfaces S210 and S214 are directed backward.

The switch cover 218 is a protective cover for the notification switch 210 and the cancel switch 214. The switch cover 218 is disposed in the right switch box 65. In the leaning vehicle 2 that is in an upright state, the switch cover 218 can rotate around a top end portion thereof within a plane perpendicular to the left-right direction. By this means, the switch cover 218 can assume a covering state in which the switch cover 218 covers the notification switch 210 and the cancel switch 214, and a non-covering state in which the switch cover 218 does not cover the notification switch 210 and the cancel switch 214. In the covering state, the rider cannot operate (that is, switch on) the notification switch 210 and the cancel switch 214. In the non-covering state, the rider can operate (that is, switch on) the notification switch 210 and the cancel switch 214.

The meter unit 80 includes meters 135 such as a speedometer, a tachometer, a fuel gauge and a water temperature gauge. The meter unit 80 is disposed in front of the handle 8 in the leaning vehicle 2. The meters 135 may be meters that have a needle and a dial, or may be meters that are displayed on a liquid crystal panel or an organic EL panel. Further, the meters 135 may include a meter having a needle and a dial and meters that are displayed on a liquid crystal panel and an organic EL panel. Hereinafter, it is assumed that the meters 135 are meters which are displayed on a liquid crystal panel.

[Tail Light Unit]

Figure 7:
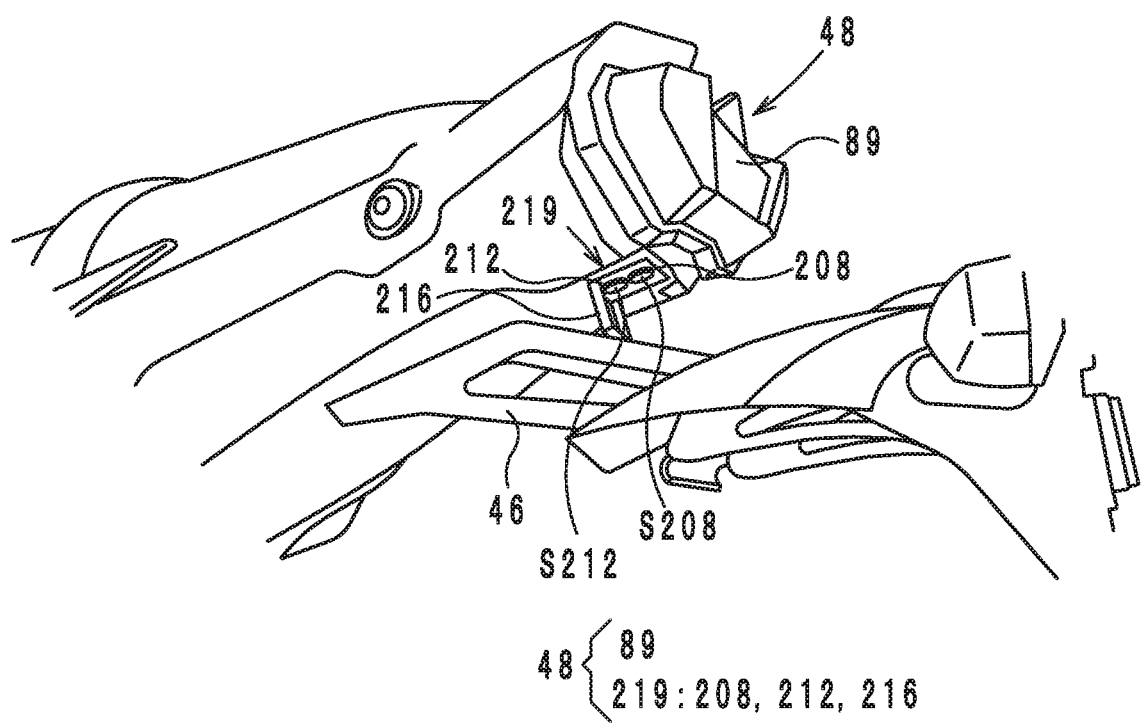
FIG. 7 is a perspective view of a tail light unit 48.
Figure 8:
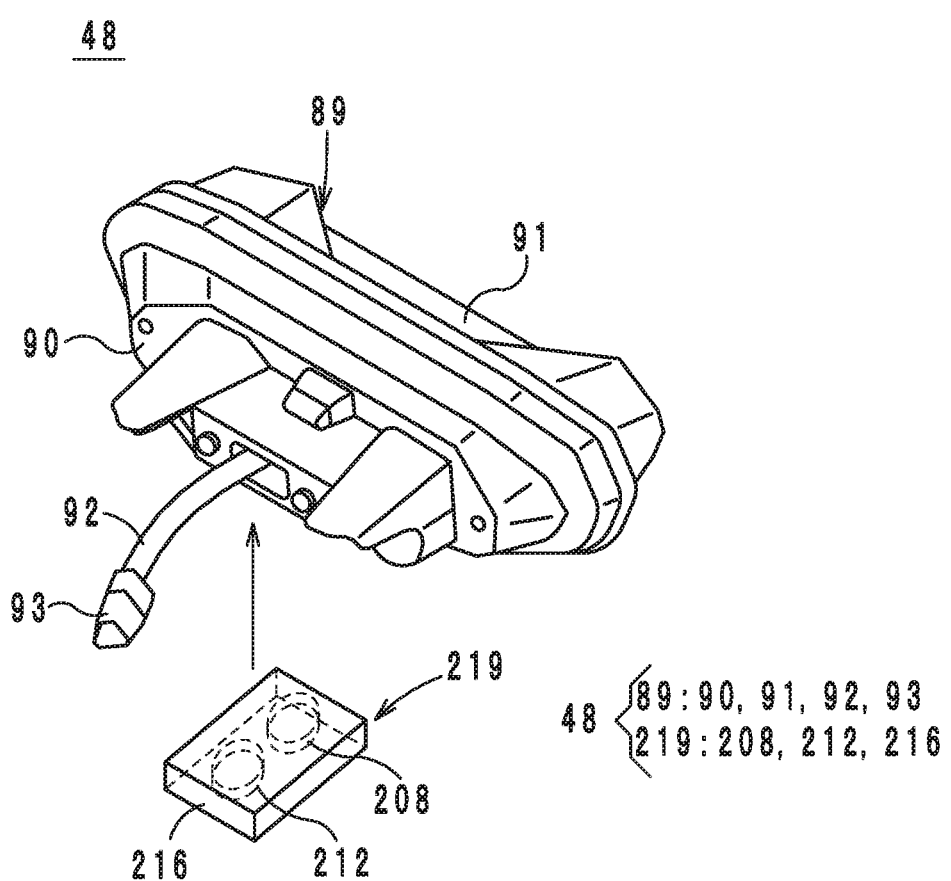
FIG. 8 is a perspective view of the tail light unit 48 in a state in which the tail light unit 48 is detached from a vehicle body 4.

The details of the tail light unit 48 will now be described while referring mainly to FIG. 7. FIG. 7 is a perspective view of the tail light unit 48. FIG. 8 is a perspective view of the tail light unit 48 in a state in which the tail light unit 48 has been detached from the vehicle body 4.

The tail light unit 48 includes a tail light 89 and the switch unit 219. The tail light 89 radiates light in the backward direction. The tail light 89 is a lighting device that includes a tail lamp and a brake lamp. In addition, the tail light 89 radiates light in the backward direction as the alarm section 221 when the leaning vehicle 2 overturns.

As described above, the tail light 89 is attached to the back end portion of the seat rail 30*c*. The seat rail 30*c* extends in the front-back direction at the center in the left-right direction of the vehicle body 4 (see FIG. 5). Therefore, the tail light 89 is disposed at the center in the left-right direction of the vehicle body 4. That is, the tail light 89 is disposed within the center region AC (see FIG. 5). In this specification, the description "a component is disposed within the center region AC" means that at least one part of the component is disposed within the center region AC.

Further, the tail light 89 includes a light source (not illustrated), a drive circuit (not illustrated), a cover 90, a lens 91, electrical wiring 92 and a connector 93 (see FIG. 8). The light source emits light upon being supplied with electric power. The light source is not particularly limited, and for example is a high-intensity discharge (HID) lamp, a halogen lamp or a light-emitting diode (LED). The drive circuit is a circuit board that controls the light emission of the light source. Note that the drive circuit may be disposed in the vehicle body 4 instead of in the tail light 89. The cover 90 is disposed at a front portion of the tail light 89. The lens 91 is disposed at a back portion of the tail light 89. The lens 91 is manufactured using a translucent material such as resin or glass. The cover 90 and lens 91 form a hollow container, and house the light source and the drive circuit. Light that the light source radiates is transmitted through the lens 91 and travels to behind the leaning vehicle 2. The electrical wiring 92 is electrically connected to the drive circuit and the light source, and is led out in the frontward direction from the cover 90. The connector 93 is disposed at the front end of the electrical wiring 92. The connector 93 is connected to a connector (not illustrated) for electrical wiring that is disposed in the vehicle body 4. By this means, electric power is supplied to the tail light 89.

The switch unit 219 includes a notification switch 208 (one example of a first notification switch), the cancel switch 212 (one example of a first cancel switch), and a switch cover 216 (first cancel switch cover). The switch unit 219 is disposed on the bottom face of the tail light 89. Thus, the switch unit 219 is disposed within the center region AC. In the present embodiment, the entire switch unit 219 is disposed within the center region AC. The notification switch 208 and the cancel switch 212 are arranged side by side in that order from the back to the front on the bottom face of the tail light 89. The notification switch 208 and the cancel switch 212 are not particularly limited, and for example are push buttons. Therefore, the notification switch 208 and the cancel switch 212 have operation surfaces S208 and S212, respectively, that the rider touches when operating the notification switch 208 and the cancel switch 212. The operation surfaces S208 and S212 are directed downward.

The switch cover 216 is a protective cover for the notification switch 208 and the cancel switch 212. The switch cover 216 is disposed on the bottom face of the tail light 89. In the leaning vehicle 2 that is in an upright state, the switch cover 216 can rotate around a front end portion thereof within a plane perpendicular to the left-right direction. By this means, the switch cover 216 can assume a covering state in which the switch cover 216 covers the notification switch 208 and the cancel switch 212, and a non-covering state in which the switch cover 216 does not cover the notification switch 208 and the cancel switch 212. With the switch cover 216 in the covering state, the rider cannot operate (that is, switch on) the notification switch 208 and the cancel switch 212. With the switch cover 216 in the non-covering state, the rider can operate (that is, switch on) the notification switch 208 and the cancel switch 212.

Further, the notification switch 208 and the cancel switch 212 are connected to the electrical wiring 92 through an electric circuit that is inside the tail light unit 48. By this means, the notification switch 208 and the cancel switch 212 are electrically connected to the control section 202 (see FIG. 1) of the leaning-vehicle-overturn-notification-system 100 through the electrical wiring 92 and electrical wiring (not illustrated) that is disposed in the vehicle body 4.

As described above, the tail light unit 48 is an electrical parts assembly with a cancel switch that can be detachably attached to the vehicle body 4 in a state in which a plurality of parts that include the notification switch 208, the cancel switch 212 and the tail light 89 (an example of at least one electrical part that is different from the first cancel switch) are combined. Hereinafter, the term "can be detachably attached" means that two components can be integrated and separated without causing damage to members.

[Visibility of Switch Units]

Figure 9:
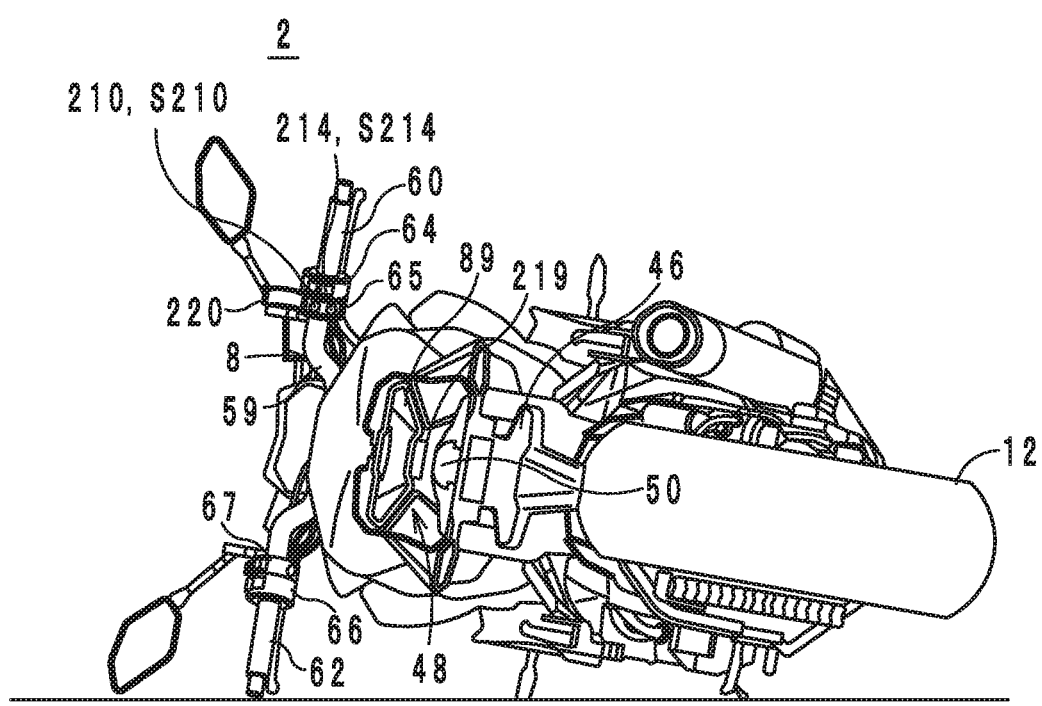
FIG. 9 is a view of the leaning vehicle 2 in an overturned state as viewed from a rearward area.

Next, the visibility of the switch units 219 and 220 will be described while referring to FIG. 9. FIG. 9 is a view of the leaning vehicle 2 in an overturned state as viewed from the backward area. In FIG. 9, an example is illustrated in which the leaning vehicle 2 overturned in a manner such that the left side face thereof is directed downward.

Since it is necessary for the tail light 89 to be visible from a following vehicle, the tail light 89 is disposed at a position that is visible from the backward area in the leaning vehicle 2 in an upright state (see FIG. 4). Therefore, as illustrated in FIG. 9, the tail light 89 is disposed at a position that is also visible from the backward area in the leaning vehicle 2 in an overturned state. Further, the switch unit 219 is disposed on the bottom face of the tail light 89 (see FIG. 7). Therefore, as illustrated in FIG. 9, the switch unit 219 is also disposed at a position that is visible from the backward area in the leaning vehicle 2 in an overturned state. By this means, the switch unit 219 is disposed at a position that is visible in one or more horizontal directions in the leaning vehicle 2 in an overturned state. Thus, the tail light 89 and the switch unit 219 are disposed at positions which can be visually recognized simultaneously in the leaning vehicle 2 in an overturned state. In particular, the tail light 89 and the switch unit 219 are in close proximity to each other. Therefore, in the leaning vehicle 2 in an overturned state, the tail light 89 and the switch unit 219 are visually recognized at the same time by the rider who operates the notification switch 208 or the cancel switch 212.

The term "horizontal direction" typically refers to a direction that is perpendicular to the direction in which the force of gravity acts, and includes the frontward direction, backward direction, rightward direction and leftward direction. However, in this specification, in addition to the typical meaning, the term "horizontal direction" also includes a direction that inclines relative to a direction that is perpendicular to the direction in which the force of gravity acts. This is because there is a possibility that a center plane of the leaning vehicle 2 in an overturned state will incline relative to the horizontal direction. The term "center plane of the leaning vehicle 2" refers to a plane that includes the center in the left-right direction of the leaning vehicle 2 in an upright state and is also perpendicular to the left-right direction. In this specification, the range of an angle (that is, an angle of elevation) formed by the "horizontal direction" and a plane perpendicular to the direction in which the force of gravity acts is −45° or more to not more than 45°.

Further, the operation surfaces S208 and S212 of the notification switch 208 and the cancel switch 212 are directed downward in the leaning vehicle 2 that is in an upright state (see FIG. 7). Accordingly, the operation surfaces S208 and S212 are directed in the horizontal direction in the leaning vehicle that is in an overturned state.

The color of the notification switch 208 and the cancel switch 212 is not particularly limited, and for example is red.

Further, the switch cover 216 is not particularly limited, and for example is transparent. In addition, the color of the bottom face of the tail light 89 is not particularly limited, and for example is black. Thus, the color of the notification switch 208 and the cancel switch 212 differ from the color of a member (the bottom face of the tail light 89) located in the area around the notification switch 208 and the cancel switch 212. Further, since the switch cover 216 is transparent, even in the covering state, the rider and a third party present in the area around the leaning vehicle 2 can visually recognize the notification switch 208 and the cancel switch 212.

Further, the right portion of the handlebar 59 is a position that the rider who straddles the leaning vehicle 2 can visually recognize. The switch unit 220 is disposed at the right portion of the handlebar 59. Thus, the switch unit 220 is disposed at a position that the rider who straddles the leaning vehicle 2 can visually recognize.

Furthermore, in the leaning vehicle 2 in an upright state, the right portion of the handlebar 59 is extended upward from the center in the left-right direction of the vehicle body 4. Therefore, the right portion of the handlebar 59 is disposed at a position that is visible from the backward area in the leaning vehicle 2 in an upright state. Further, as illustrated in FIG. 9, the right portion of the handlebar 59 is disposed at a position that is also visible from the backward area in the leaning vehicle 2 in an overturned state. The right switch box 65 is disposed at the right portion of the handlebar 59. Therefore, the right switch box 65 is disposed at a position that is also visible from the backward area in the leaning vehicle 2 in an overturned state. The switch unit 220 is disposed on the back surface of the right switch box 65. Therefore, the switch unit 220 is disposed at a position that is also visible from the backward area in the leaning vehicle 2 in an overturned state. By this means, the switch unit 220 is disposed at a position that is visible in one or more horizontal directions in the leaning vehicle 2 in an overturned state.

Further, the operation surfaces S210 and S214 of the notification switch 210 and the cancel switch 214 are directed backward in the leaning vehicle 2 in an upright state. Accordingly, in the leaning vehicle in an overturned state, the operation surfaces S210 and S214 are directed in the horizontal direction (more exactly, in the rearward direction).

The color of the notification switch 210 and the cancel switch 214 is not particularly limited, and for example is red. Further, the color of the switch cover 218 is not particularly limited, and for example is black. In addition, the color of the right switch box 65 is not particularly limited, and for example is black. Thus, the color of the notification switch 210 and the cancel switch 214 differ from the color of a member (the back surface of the right switch box 65) located in the area around the notification switch 210 and the cancel switch 214.

[Effects]

According to the leaning vehicle 2, in the leaning vehicle 2 in an overturned state, there is a high probability that the rider can quickly operate the cancel switch 212. There is a high probability that the leaning vehicle 2 in an overturned state will assume a posture in which the right side face or the left side face thereof is directed downward. On the other hand, when the leaning vehicle 2 overturns, there is a high probability that the rider will be on the ground. At such time, the rider can visually recognize the front face, rear face, top surface or undersurface in the leaning vehicle 2 in an upright state. In other words, the front face, rear face, top surface and undersurface of the leaning vehicle 2 in an upright state are visible in one or more horizontal directions in the leaning vehicle 2 in an overturned state. Thus, the switch unit 219 is disposed at a position that is visible in one or more horizontal directions in the leaning vehicle 2 in an overturned state. By this means, there is a high probability that the rider can quickly recognize the position of the cancel switch 212 when the leaning vehicle 2 overturns.

However, in the leaning vehicle 2 in an overturned state, if the switch unit 219 is disposed at a position for which there is a high probability that the switch unit 219 will be concealed below the vehicle body 4, in some cases it may be difficult for the rider to operate the cancel switch 212. Therefore, in the leaning vehicle 2, the switch unit 219 is disposed within the center region AC. The center region AC is a region that, in the leaning vehicle 2 in an upright state, is in the vicinity of the center in the left-right direction. Therefore, the center region AC is a region for which the probability of being concealed below the vehicle body 4 is low in the leaning vehicle 2 in an overturned state. By this means, in the leaning vehicle 2 in an overturned state, there is a high probability that it will be possible for the rider to operate the cancel switch 212.

As described above, the switch unit 219 is disposed at a position which is easy for the rider to visually recognize and is also easy for the rider to operate in the leaning vehicle 2 in an overturned state. As a result, in the leaning vehicle 2 in an overturned state, there is a high probability that the rider can find the cancel switch 212 quickly, and there is also a high probability that the rider can operate the cancel switch 212. Thus, there is a high probability that the rider can quickly cancel notification of the overturn occurrence information Ia to the center 102 by the leaning-vehicle-overturn-notification-system 100, or cancel the notification of the overturn occurrence information Ia that was notified of to the center 102 by the leaning-vehicle-overturn-notification-system 100.

Further, in the leaning vehicle 2, the switch unit 220 is not necessarily essential. However, it is preferable to combine the switch unit 219 of the leaning vehicle 2 with the switch unit 220. The notification switch 210 and the cancel switch 214 have the same structure as the notification switch and the cancel switch that have already been proposed in the prior art, as is described in Non Patent Literature 1 also. Specifically, the notification switch 210 and the cancel switch 214 are disposed close to the right handle grip 60. In a state in which the rider straddles the leaning vehicle 2 in an upright state, the rider can visually recognize the notification switch 210 and the cancel switch 214. Therefore, when the leaning vehicle 2 is travelling, the rider can recognize the positions of the notification switch 210 and the cancel switch 214. In addition, in a state in which the rider straddles the leaning vehicle 2 in an upright state, the rider can operate the notification switch 210 and the cancel switch 214. However, there is a risk that the notification switch 210 and the cancel switch 214 will be concealed below the vehicle body 4 if the leaning vehicle 2 overturns in a manner such that the right side face of the vehicle body 4 is directed downward.

The inventors of the present application conducted studies regarding disposing an additional left switch box to the right of the left switch box 67 so as to be adjacent to the left switch box 67, and disposing a notification switch and a cancel switch in the additional left switch box. By this means, even in a case where the leaning vehicle 2 overturns in a manner such that either the right side face or the left side face of the leaning vehicle 2 is directed downward, there will be a cancel switch that is not concealed below the vehicle body 4. Taking into account such studies, the inventors of the present application investigated the idea of disposing the notification switch 208 and the cancel switch 212 at a position other than a position adjacent to the left switch box 67.

As a result, the inventors of the present application disposed the switch unit 219 at a position that is within the center region AC, and is visible in one or more horizontal directions in the leaning vehicle 2 in an overturned state. By this means, even if the switch unit 220 is concealed below the vehicle body 4 in the leaning vehicle 2 in an overturned state, there is a high probability that the rider can quickly operate the cancel switch 212 of the switch unit 219. Thus, the notification switch 210 and the cancel switch 214 are disposed at positions at which the notification switch 210 and the cancel switch 214 are easy to operate when the leaning vehicle 2 is in an upright state. In addition, the notification switch 208 and the cancel switch 212 are disposed at positions which are easy for the rider to visually recognize in the leaning vehicle 2 in an overturned state. The notification switch 208 and the cancel switch 212 are disposed at positions at which the notification switch 208 and the cancel switch 212 are easy to operate in the leaning vehicle 2 in an overturned state. By this means, regardless of whether the leaning vehicle 2 is in an upright state or an overturned state, there is a high probability that the rider can quickly operate the notification switches 208 and 210 and the cancel switches 212 and 214.

Further, in the leaning vehicle 2, the routing of the electrical wiring is simplified. More specifically, the switch unit 219 is included in the tail light unit 48. By this means, it is possible to provide electrical wiring that connects the notification switch 208 and cancel switch 212 with the control section 202 within the electrical wiring 92 of the tail light unit 48. The leaning vehicle 2 may not include electrical wiring that connects the notification switch 208 and cancel switch 212 with the control section 202 that is separate from the electrical wiring 92 of the tail light 89. As a result, in the leaning vehicle 2, the routing of the electrical wiring is simplified.

Further, according to the leaning vehicle 2, there is a higher probability that the rider can recognize the switch unit 219. More specifically, when the tail light 89 radiates light as the alarm section 221, the attention of the rider is drawn to the tail light 89. The tail light 89 and the switch unit 219 are disposed at positions that are visually recognizable at the same time in the leaning vehicle 2 in an overturned state. By this means, there is a higher probability that the rider can recognize the switch unit 219.

Furthermore, according to the leaning vehicle 2, there is a higher probability that the rider can recognize the notification switch 208 and the cancel switch 212.

More specifically, the switch cover 216 is transparent. Hence, even in a covering state, the rider can recognize the notification switch 208 and the cancel switch 212. In addition, the color of the notification switch 208 and the cancel switch 212 is different from the color of a member (bottom face of the tail light 89) positioned around the notification switch 208 and the cancel switch 212. Therefore, the rider can recognize the existence of the notification switch 208 and the cancel switch 212 by means of the color.

[First Modification]

Figure 10:
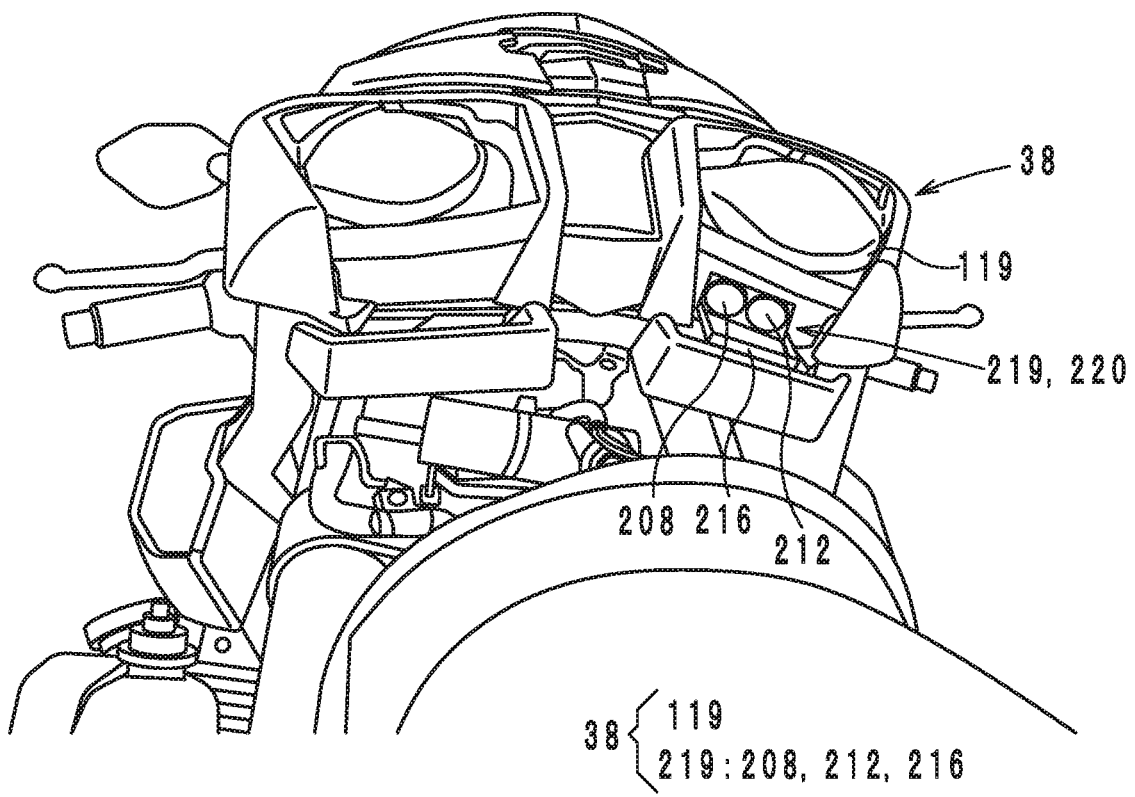
FIG. 10 is a perspective view of a front light unit 38.
Figure 11:
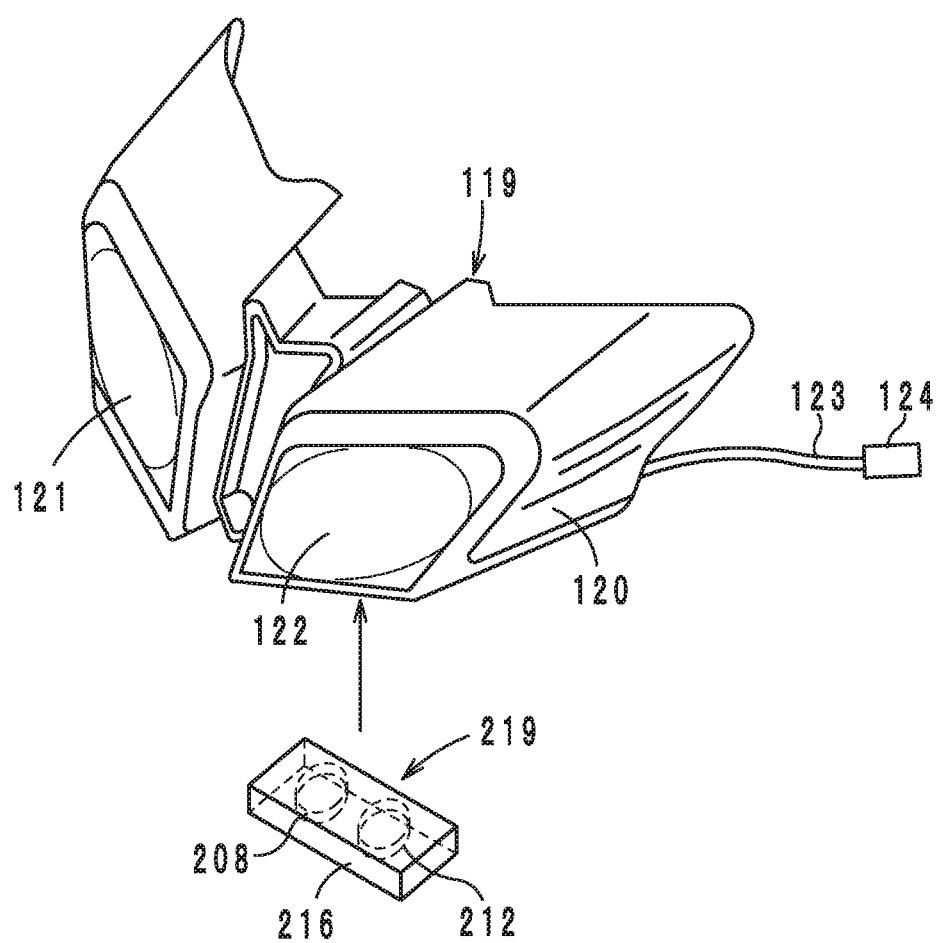
FIG. 11 is a perspective view of the front light unit 38 in a state in which the front light unit 38 is detached from the vehicle body 4.

Hereunder, the switch unit 219 according to a first modification is described while referring mainly to FIG. 10. The switch unit 219 according to the first modification is included in the front light unit 38. FIG. 10 is a perspective view of the front light unit 38. FIG. 11 is a perspective view of the front light unit 38 in a state in which the front light unit 38 is detached from the vehicle body 4.

The front light unit 38 includes a front light 119 and the switch unit 219. The front light 119 radiates light in the frontward direction. The front light 119 is a lighting device that includes a travelling light and a passing light. In addition, the front light 119 radiates light in the frontward direction as the alarm section 221 when the leaning vehicle 2 has overturned.

As described in the foregoing, the front light 119 is attached to the stay 32, and is disposed at the front end portion of the vehicle body 4 (see FIG. 4). The stay 32 is disposed at the center in the left-right direction of the vehicle body 4. Therefore, the front light 119 is disposed at the center in the left-right direction of the vehicle body 4. That is, the front light 119 is disposed within the center region AC (see FIG. 5).

The front light 119 includes a light source (not illustrated), a drive circuit (not illustrated), a cover 120, lenses 121 and 122, electrical wiring 123, a connector 124 and the switch unit 219 (see FIG. 11). The light source emits light when supplied with electric power. The light source is not particularly limited, and for example is a HID lamp, a halogen lamp or an LED. The drive circuit controls the light emission of the light source. Note that, the drive circuit may be disposed in the vehicle body 4 instead of in the front light 119. The cover 120 forms a hollow container, and houses the light source and the drive circuit. The lenses 121 and 122 are disposed at a front part of the cover 120. The lenses 121 and 122 are aligned in that order from the right to the left. The lenses 121 and 122 are manufactured using a translucent material such as resin or glass. Light that the light source radiates is transmitted through the lenses 121 and 122 and travels to the front of the leaning vehicle 2. The electrical wiring 123 is electrically connected to the drive circuit and the light source, and is led out in the backward direction from the cover 120. The connector 124 is disposed at the front end of the electrical wiring 123. The connector 124 is connected to a connector (not illustrated) for electrical wiring that is disposed in the vehicle body 4. By this means, electric power is supplied to the front light 119.

The switch unit 219 is disposed on the bottom face of the front light 119. Therefore, the switch unit 219 is disposed within the center region AC. Further, the switch unit 219 is visible in one or more horizontal directions in the leaning vehicle 2 in an overturned state. The notification switch 208 and the cancel switch 212 are aligned in that order from right to left on the bottom face of the cover 120.

The switch cover 216 is a protective cover for the notification switch 208 and the cancel switch 212. The switch cover 216 is disposed on the bottom face of the cover 120. In the leaning vehicle 2 that is in an upright state, the switch cover 216 can rotate around a back end portion thereof within a plane perpendicular to the left-right direction.

Further, the notification switch 208 and the cancel switch 212 are connected to the electrical wiring 123 through an electric circuit that is inside the front light 119. By this means, the notification switch 208 and the cancel switch 212 are connected to the control section 202 of the leaning-vehicle-overturn-notification-system 100 through the electrical wiring 123 and electrical wiring that is disposed in the vehicle body 4.

As described above, the front light unit 38 is an electrical parts assembly with a cancel switch that can be detachably attached to the vehicle body 4 in a state in which a plurality of parts that include the notification switch 208, the cancel switch 212 and the front light 119 (an example of at least one electrical part that is different from the first cancel switch) are combined.

[Second Modification]

Figure 12:
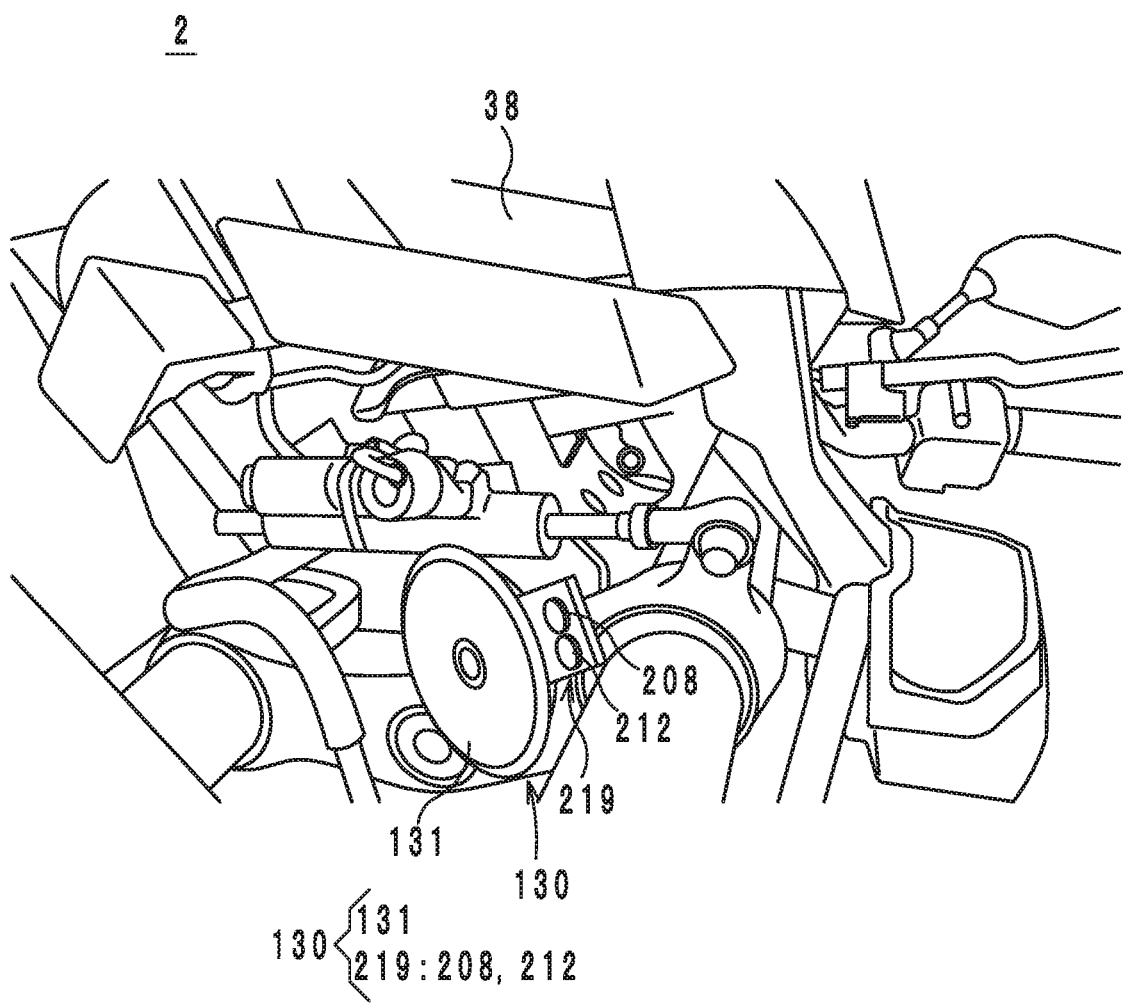
FIG. 12 is a perspective view of a horn unit 130 as viewed from a frontward and downward area.

Hereunder, the switch unit 219 according to a second modification is described while referring mainly to FIG. 12. The switch unit 219 according to the second modification is included in a horn unit 130. FIG. 12 is a perspective view of the horn unit 130 as viewed from a frontward and downward area.

The leaning vehicle 2 further includes the horn unit 130. The horn unit 130 includes a horn 131 and the switch unit 219. The horn 131 is a safety apparatus for informing other traffic by sound that the leaning vehicle 2 is approaching. The horn 131 generates a sound towards the frontward and downward direction when the rider operates a horn button of the leaning vehicle 2. In addition, the horn 131 generates a sound as the alarm section 221 when the leaning vehicle 2 has overturned.

The horn 131 is disposed further backward and downward than the front light unit 38. The horn 131 is disposed in the vicinity of the center in the left-right direction of the vehicle body 4. That is, the horn 131 is disposed within the center region AC. Furthermore, the horn 131 is disposed at a position that is visible from the frontward area in the leaning vehicle 2 in an upright state.

The switch unit 219 includes the notification switch 208 and the cancel switch 212. The switch unit 219 is disposed to the left of the horn 131. Therefore, the switch unit 219 is disposed within the center region AC. Further, the switch unit 219 is disposed at a position that is visible from the frontward area in the leaning vehicle 2 in an overturned state. The notification switch 208 and the cancel switch 212 are aligned in that order from the up to the down to the left of the horn 131.

In this connection, the horn 131 is disposed at a position such that possibility of the horn 131 being touched by the rider or a third party present in the area around the leaning vehicle 2 is normally low. Therefore, the possibility of the rider or a third party unnecessarily operating the notification switch 208 and the cancel switch 212 is low. Accordingly, in a case where the switch unit 219 is included in the horn unit 130, the switch unit 219 need not include the switch cover 216. However, the switch unit 219 according to the second modification may include the switch cover 216.

As described above, the horn unit 130 is an electrical parts assembly with a cancel switch that can be detachably attached to the vehicle body 4 in a state in which a plurality of parts that include the notification switch 208, the cancel switch 212 and the horn 131 (an example of at least one electrical part that is different from the first cancel switch) are combined.

[Third Modification]

Figure 13:
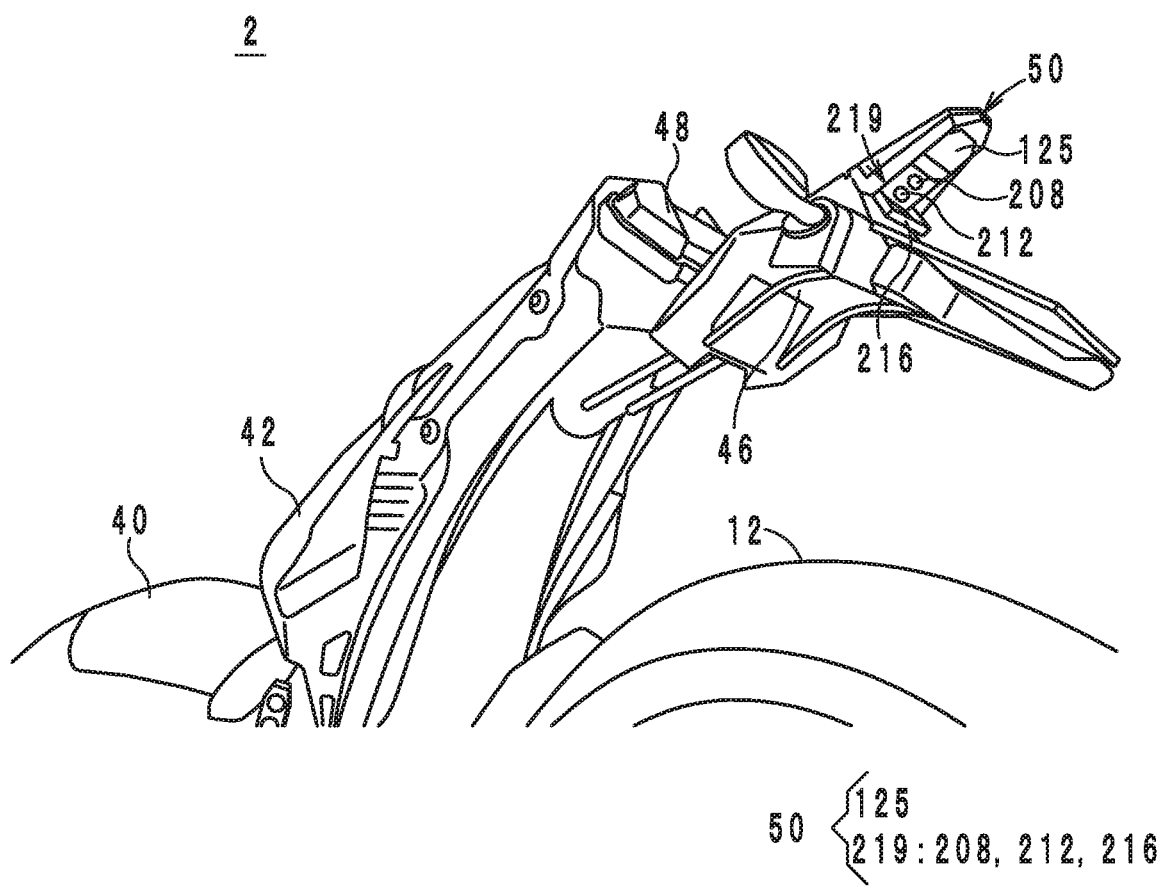
FIG. 13 is a perspective view of a license plate light unit 50.

Hereunder, the switch unit 219 according to a third modification will be described while referring to FIG. 13. The switch unit 219 according to the third modification is included in the license plate light unit 50. FIG. 13 is a perspective view of the license plate light unit 50.

The license plate light unit 50 includes a license plate light 125 and the switch unit 219. The license plate light 125 is a lighting device that radiates light towards the license plate. In addition, the license plate light 125 radiates light as the alarm section 221 when the leaning vehicle 2 has overturned.

As described above, the license plate light 125 extends in the backward direction from the center in the up-down direction of the rear fender 46. The rear fender 46 is disposed at the center in the left-right direction of the vehicle body 4. Therefore, the license plate light 125 is disposed at the center in the left-right direction of the vehicle body 4. That is, the license plate light 125 is disposed within the center region AC (see FIG. 5).

The switch unit 219 is disposed in front of the license plate light 125. Therefore, the switch unit 219 is disposed within the center region AC. Further, the switch unit 219 is visible from the backward area in the leaning vehicle 2 in an overturned state. The notification switch 208 and the cancel switch 212 are aligned in that order from the back to the front in front of the license plate light 125.

The switch cover 216 is a protective cover for the notification switch 208 and the cancel switch 212. The switch cover 216 is disposed in front of the license plate light 125. In the leaning vehicle 2 that is in an upright state, the switch cover 216 can rotate around a front end portion thereof within a plane perpendicular to the left-right direction.

As described above, the license plate light unit 50 is an electrical parts assembly with a cancel switch that can be detachably attached to the vehicle body 4 in a state in which a plurality of parts that include the notification switch 208, the cancel switch 212 and the license plate light 125 (an example of at least one electrical part that is different from the first cancel switch) are combined.

Second Embodiment

Figure 14:
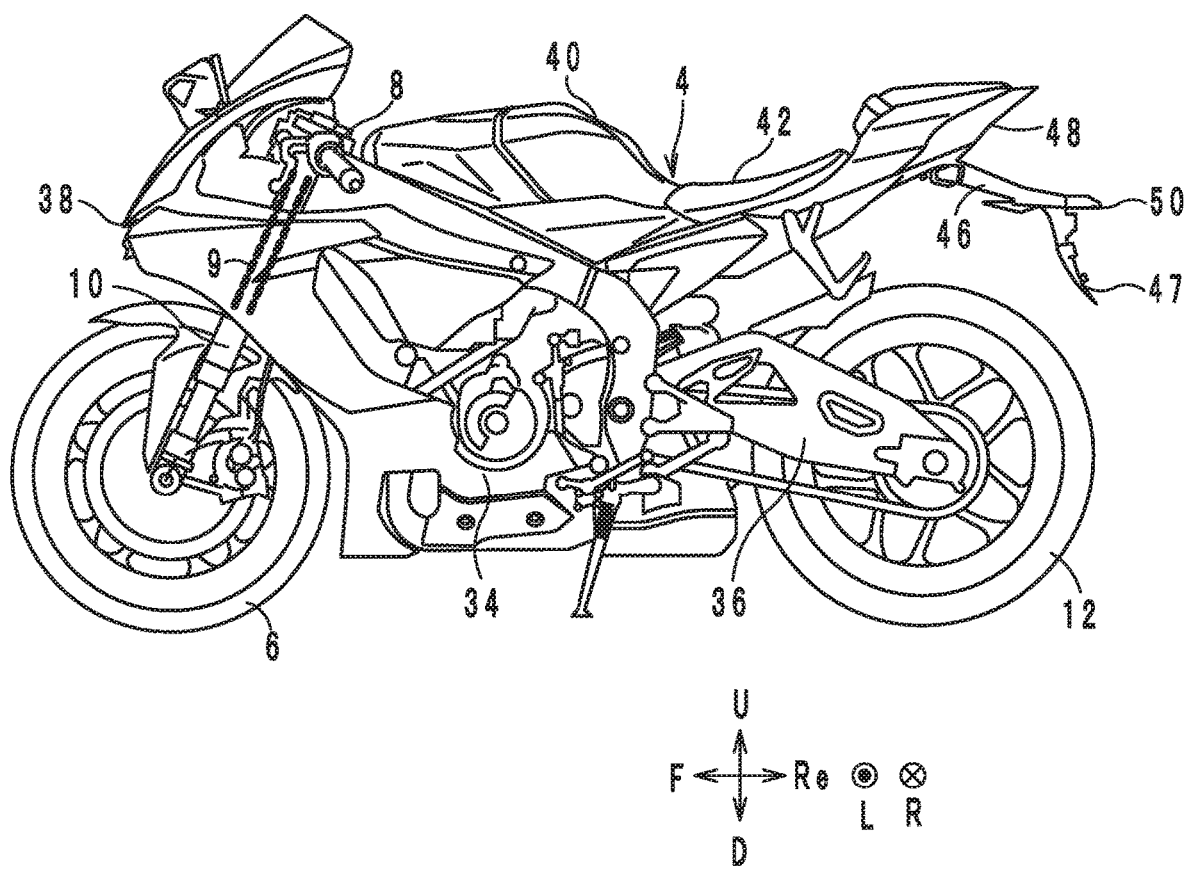

Next, a leaning vehicle 2a according to a second embodiment will be described while referring to FIG. 14. FIG. 14 is a left side view of the leaning vehicle 2a.

The leaning vehicle 2a is a super sport-type motorcycle. In the leaning vehicle 2a, similarly to the leaning vehicle 2, the switch unit 219 (not illustrated in FIG. 14) may be included in the front light unit 38, the tail light unit 48, the license plate light unit 50 or the horn unit 130 (not illustrated in FIG. 14). However, a description of an example in which the switch unit 219 is included in the front light unit 38, the tail light unit 48, the license plate light unit 50 or the horn unit 130 is omitted here. Hereunder, an example in which, in the leaning vehicle 2a, the switch unit 219 is included in the meter unit 80 (not illustrated in FIG. 14), and an example in which the switch unit 219 is disposed in a seat cowl 250 (not illustrated in FIG. 14) will be described. Note that, unlike the leaning vehicle 2, the leaning vehicle 2a does not include the switch unit 220. However, the leaning vehicle 2a may include the switch unit 220, similarly to the leaning vehicle 2.

[Meter Unit]

Figure 15:
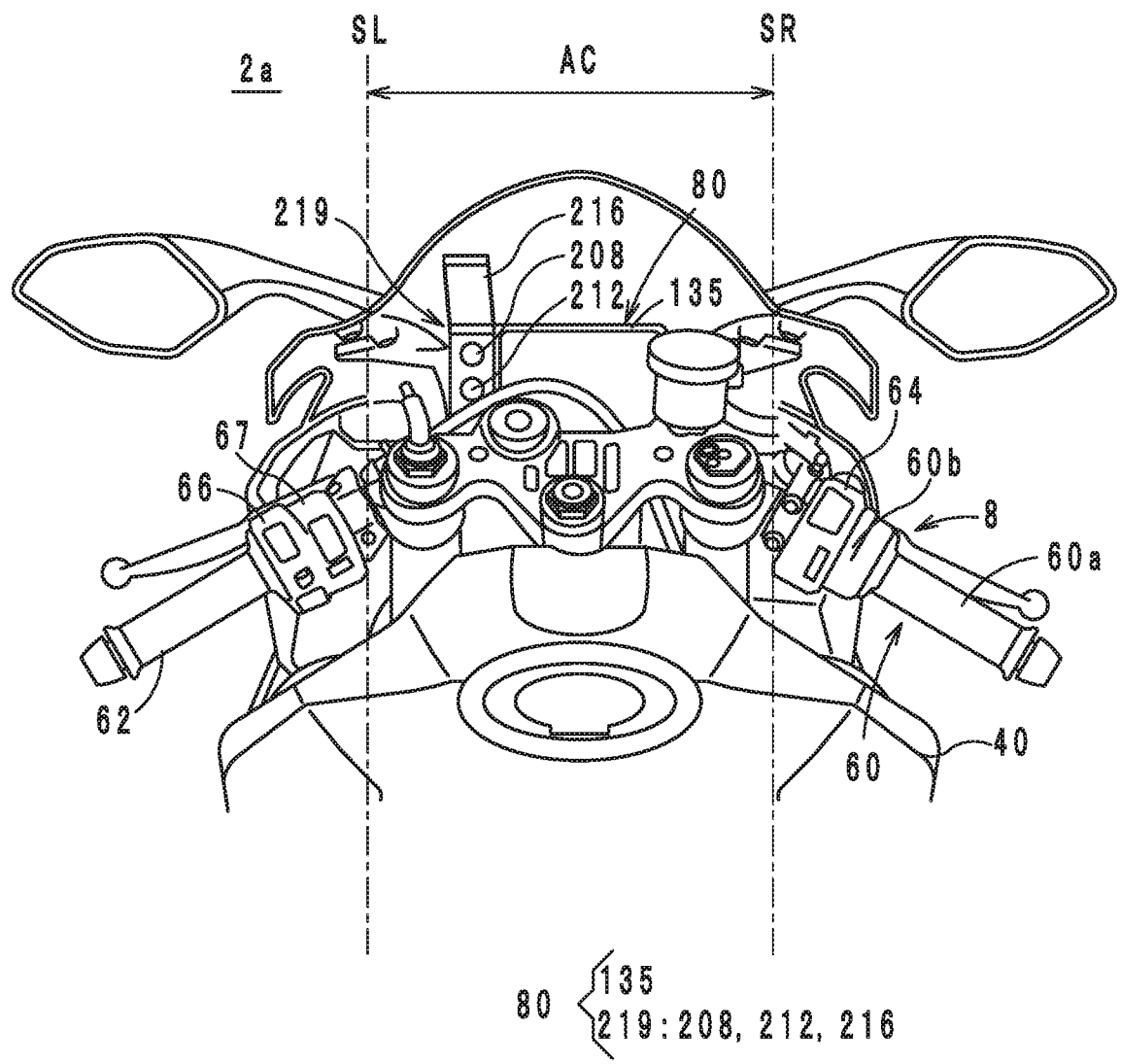
FIG. 15 is a perspective view of a handle 8 and a meter unit 80 as viewed from a rearward and upward area.

In the leaning vehicle 2a, the switch unit 219 may be included in the meter unit 80. FIG. 15 is a perspective view of the handle 8 and the meter unit 80 as viewed from a backward and upward area.

The meter unit 80 includes the meters 135 and the switch unit 219. The meters 135 are disposed in front of the handle 8, at a position that is at the center in the left-right direction of the vehicle body 4. Hence, the meters 135 are disposed within the center region AC. Further, the meters 135 display images toward the backward and upward direction.

The switch unit 219 is disposed to the left of the meters 135. Hence, the switch unit 219 is disposed within the center region AC. Further, the switch unit 219 is disposed at a position that, in the leaning vehicle 2a in an upright state, is visible from the backward and upward area. Therefore, the switch unit 219 is disposed at a position that is visible in one or more horizontal directions when the leaning vehicle 2a in an overturned state. Since the details of the switch unit 219 have already been described above, a detailed description thereof is omitted here.

As described above, the meter unit 80 is an electrical parts assembly with a cancel switch that can be detachably attached to the vehicle body 4 in a state in which a plurality of parts that include the notification switch 208, the cancel switch 212 and the meters 135 (an example of at least one electrical part that is different from the first cancel switch) are combined.

[Seat Cowl]

Figure 16:
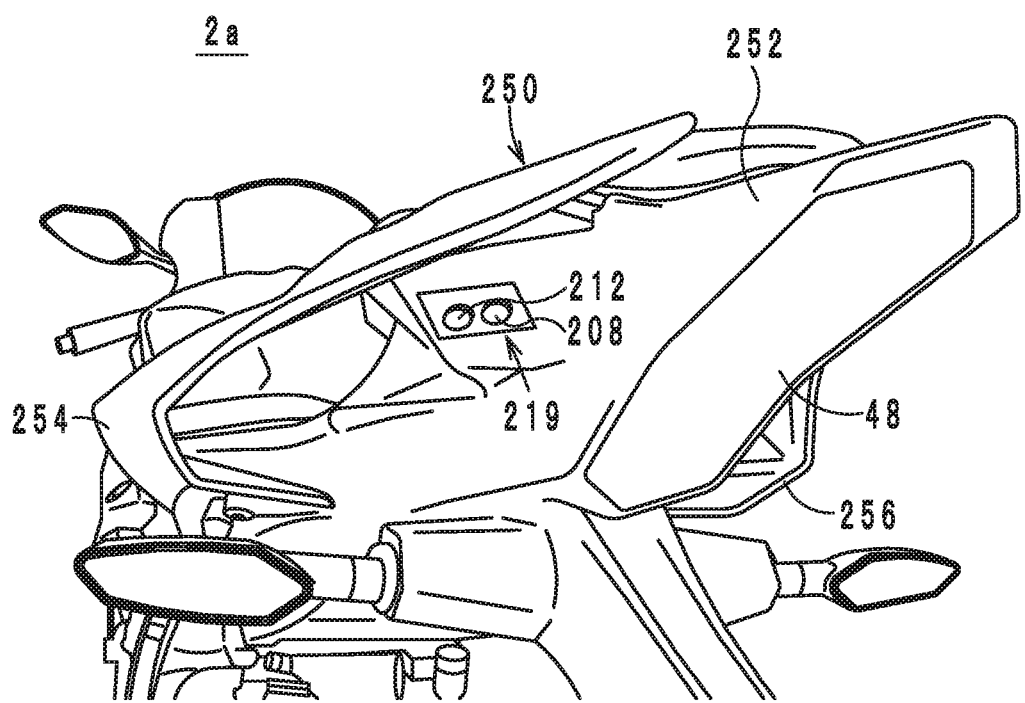
FIG. 16 is a perspective view of a seat cowl 250 as viewed from the rearward area.

FIG. 16 is a perspective view of the seat cowl 250 as viewed from the backward area. In the leaning vehicle 2a, the switch unit 219 may be disposed in the seat cowl 250. The leaning vehicle 2a includes the seat cowl 250. The seat cowl 250 is a vehicle body cover that covers a portion of the vehicle body 4. The seat cowl 250 is disposed behind the seat 42, at a position that is directly above the drive wheel 12. The seat cowl 250 includes an inner cowl 252 and outer cowls 254 and 256.

The inner cowl 252 is attached to an upper face, right face and left face of the seat rail 30c. The outer cowl 254 is disposed to the left of the inner cowl 252. The inner cowl 252 and the outer cowl 254 form a tubular shape that extends in the front-back direction. A front face and a back face of the tubular shape that the inner cowl 252 and the outer cowl 254 form are open. The outer cowl 256 is disposed to the right of the inner cowl 252. The inner cowl 252 and the outer cowl 256 form a tubular shape that extends in the front-back direction. A front face and a back face of the tubular shape that the inner cowl 252 and the outer cowl 256 form are open. The inner cowl 252 and the outer cowls 254 and 256 are disposed within the center region AC.

The switch unit 219 is disposed on the left face of the inner cowl 252. Hence, the switch unit 219 is disposed within the center region AC. Further, the front face and the back face of the tubular shape that the inner cowl 252 and the outer cowl 254 form are open. Therefore, the switch unit 219 is disposed at a position that is visible from the frontward area or backward area when the leaning vehicle 2a is in an upright state. Accordingly, the switch unit 219 is disposed at a position that is visible in one or more horizontal directions when the leaning vehicle 2a is in an overturned state.

In this connection, the space that is enclosed by the inner cowl 252 and the outer cowl 254 is a space for which normally the possibility of the rider or a third party present in the area around the leaning vehicle 2a touching something that is present in that space is low. Therefore, the possibility of the rider or a third party unnecessarily operating the notification switch 208 and the cancel switch 212 is low. Accordingly, in a case where the switch unit 219 is disposed on the left face of the inner cowl 252, the switch unit 219 need not include the switch cover 216. However, the leaning vehicle 2a may include the switch cover 216, similarly to the leaning vehicle 2.

Note that the switch unit 219 may be disposed on the right face of the inner cowl 252, may be disposed on the right face of the outer cowl 254, or may be disposed on the left face of the outer cowl 256.

Third Embodiment

Figure 17:
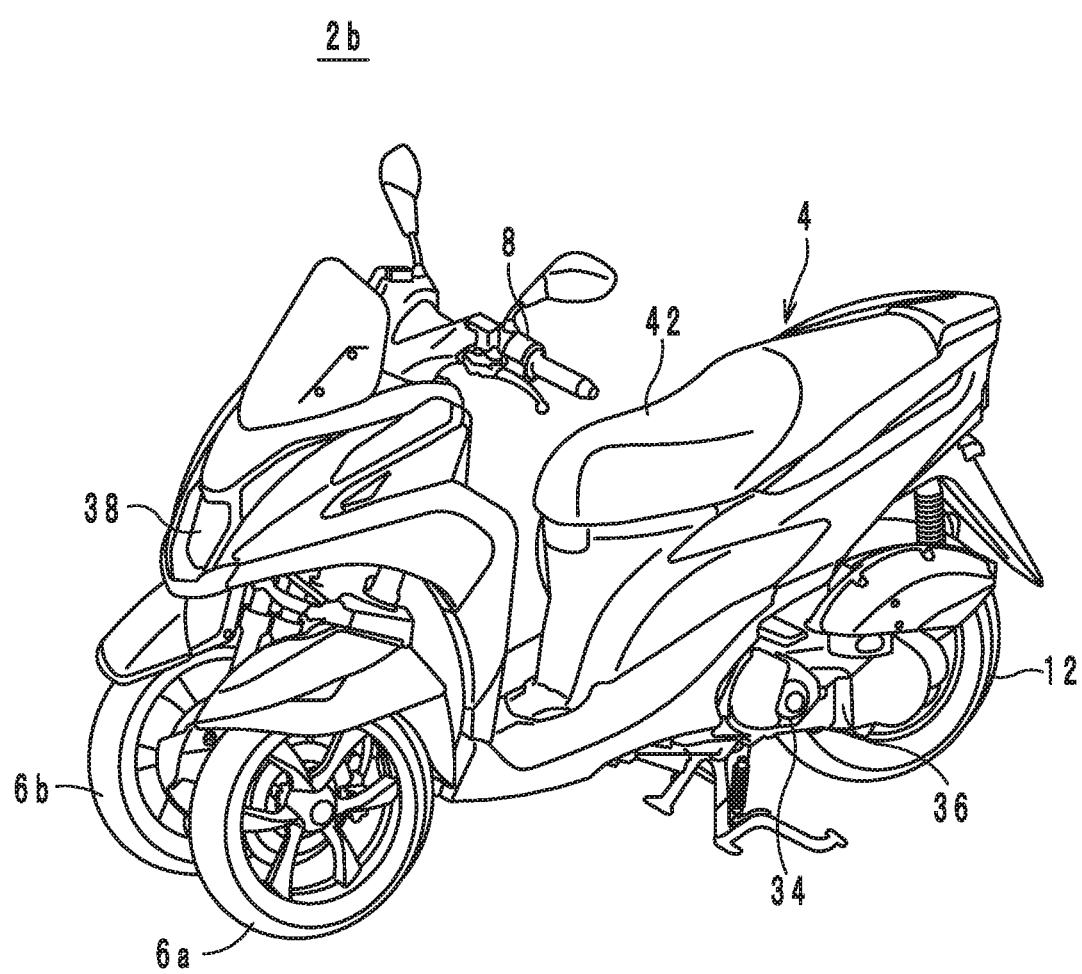
FIG. 17 is a perspective view of a leaning vehicle 2b.

Next, a leaning vehicle 2b according to a third embodiment will be described while referring to FIG. 17. FIG. 17 is a perspective view of the leaning vehicle 2b.

The leaning vehicle 2b is a scooter-type tricycle. The leaning vehicle 2b is a leaning vehicle that includes steerable wheels 6a and 6b, and a drive wheel 12. In the leaning vehicle 2b, similarly to the leaning vehicle 2, the switch unit 219 may be included in the front light unit 38, the tail light unit 48 (not illustrated in FIG. 17), the license plate light unit 50 (not illustrated in FIG. 17), or the horn unit 130 (not illustrated in FIG. 17). However, a description of an example in which the switch unit 219 is included in the front light unit 38 or the license plate light unit 50 is omitted here. Hereunder, examples in which, in the leaning vehicle 2b, the switch unit 219 is included in the meter unit 80, the tail light unit 48 or the horn unit 130 will be described. Note that, unlike the leaning vehicle 2, the leaning vehicle 2b does not include the switch unit 220. However, the leaning vehicle 2b may include the switch unit 220, similarly to the leaning vehicle 2.

[Meter Unit]

Figure 18:
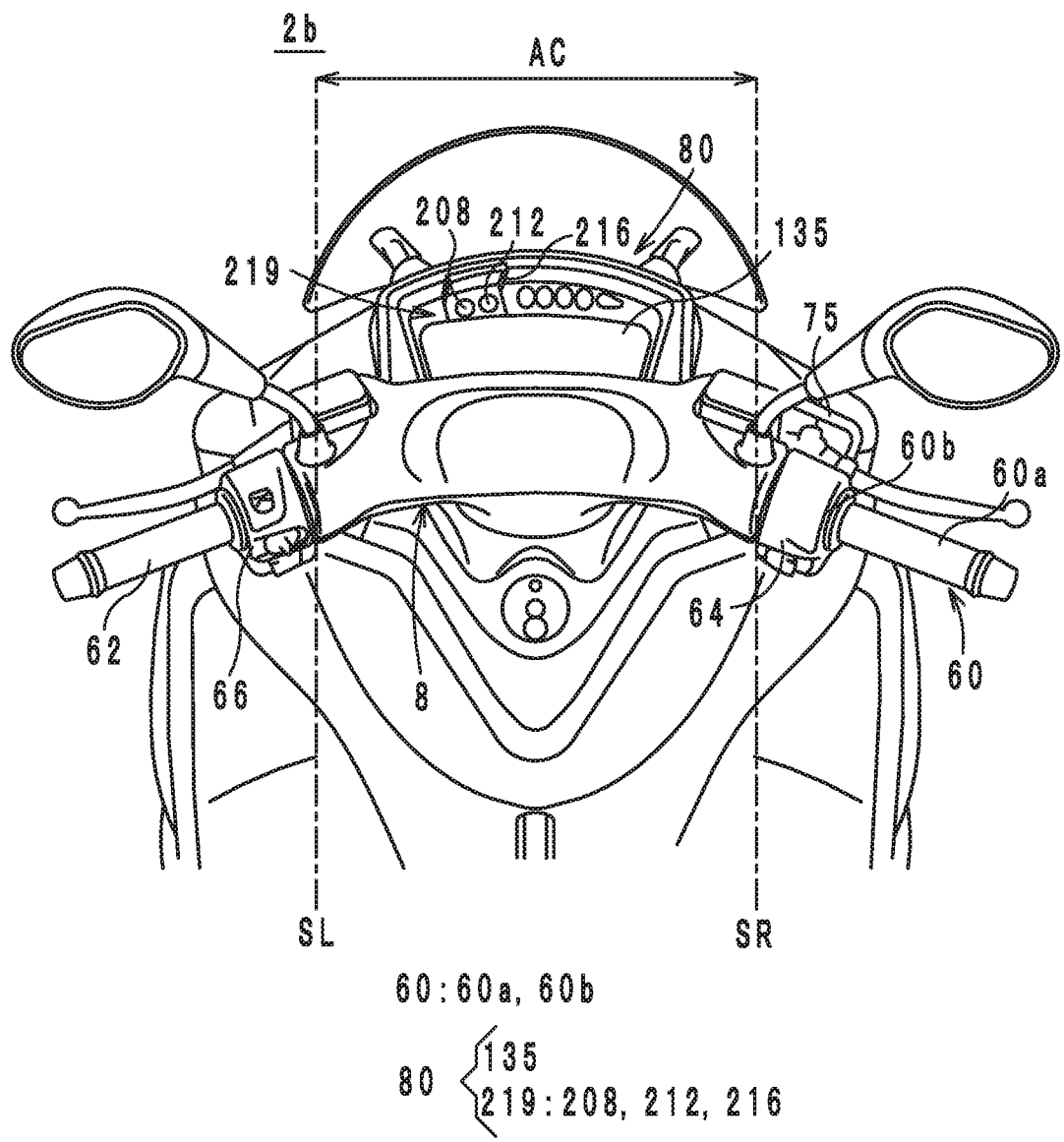
FIG. 18 is a perspective view of a handle 8 and a meter unit 80 as viewed from a rearward and upward area.

In the leaning vehicle 2b, the switch unit 219 may be included in the meter unit 80. FIG. 18 is a perspective view of the handle 8 and the meter unit 80 as viewed from a backward and upward area.

The meter unit 80 includes the meters 135 and the switch unit 219. The meters 135 are disposed in front of the handle 8, at a position that is at the center in the left-right direction of the vehicle body 4. Hence, the meter unit 80 is disposed within the center region AC. Further, the meters 135 display images toward the backward and upward direction.

The switch unit 219 is disposed at a position that is in front of the meters 135 and is in the vicinity of a left-front corner of the meters 135. Hence, the switch unit 219 is disposed within the center region AC. Further, the switch unit 219 is disposed at a position that is visible from the backward and upward area when the leaning vehicle 2b is in an upright state. Therefore, the switch unit 219 is disposed at a position that is visible in one or more horizontal directions when the leaning vehicle 2b is in an overturned state. Since the details of the switch unit 219 have already been described above, a detailed description thereof is omitted here.

As described above, the meter unit 80 is an electrical parts assembly with a cancel switch that can be detachably attached to the vehicle body 4 in a state in which a plurality of parts that include the notification switch 208, the cancel switch 212 and the meters 135 (an example of at least one electrical part that is different from the first cancel switch) are combined.

[Tail Light Unit]

Figure 19:
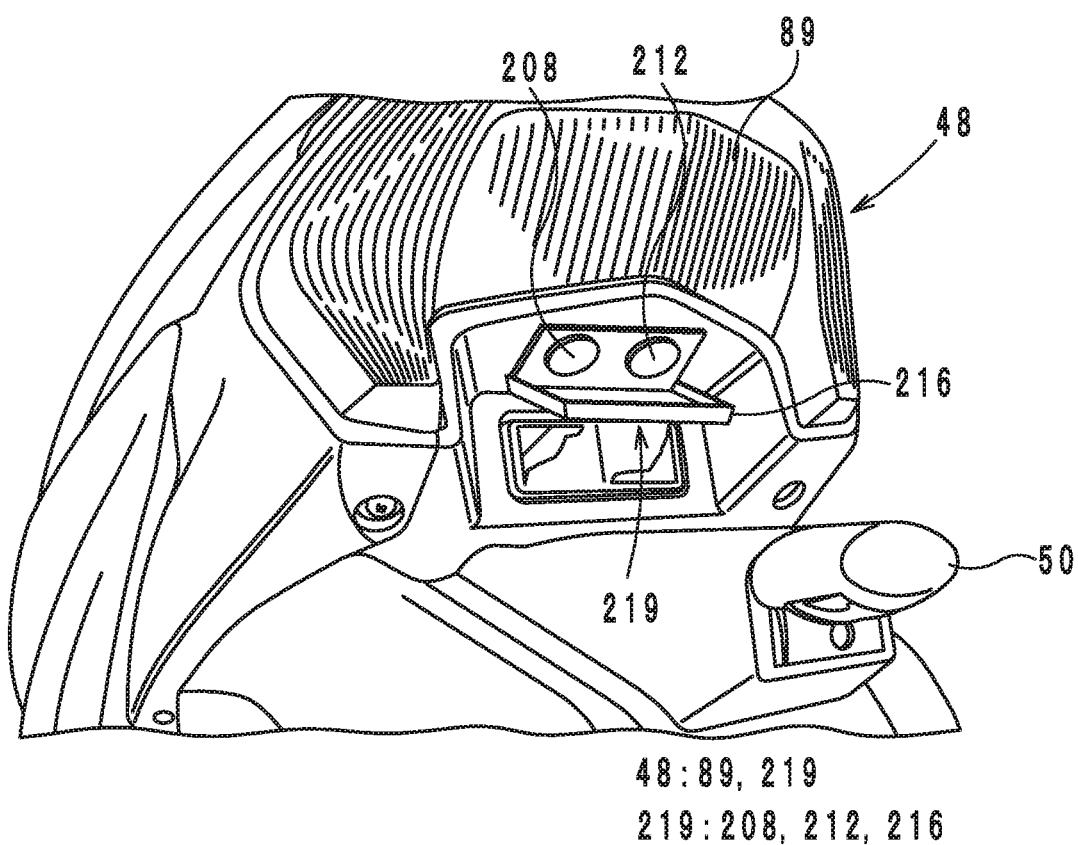
FIG. 19 is a perspective view of a tail light unit 48.

In the leaning vehicle 2b, the switch unit 219 may be included in the tail light unit 48. FIG. 19 is a perspective view of the tail light unit 48.

The tail light unit 48 includes the tail light 89 and the switch unit 219. The tail light 89 is disposed at a position that is at the center in the left-right direction of the vehicle body 4 and is at the back end portion of the vehicle body 4. Hence, the tail light 89 is disposed within the center region AC.

The switch unit 219 is disposed on the bottom face of the tail light 89 (see FIG. 19). Hence, the switch unit 219 is disposed within the center region AC. Further, the switch unit 219 is disposed at a position that is visible from the backward area when the leaning vehicle 2b is in an upright state. Therefore, the switch unit 219 is disposed at a position that is visible in one or more horizontal directions when the leaning vehicle 2b is in an overturned state. Since the details of the switch unit 219 have already been described above, a detailed description thereof is omitted here.

As described above, the tail light unit 48 is an electrical parts assembly with a cancel switch that can be detachably attached to the vehicle body 4 in a state in which a plurality of parts that include the notification switch 208, the cancel switch 212 and the tail light 89 (an example of at least one electrical part that is different from the first cancel switch) are combined.

[Horn Unit]

Figure 20:
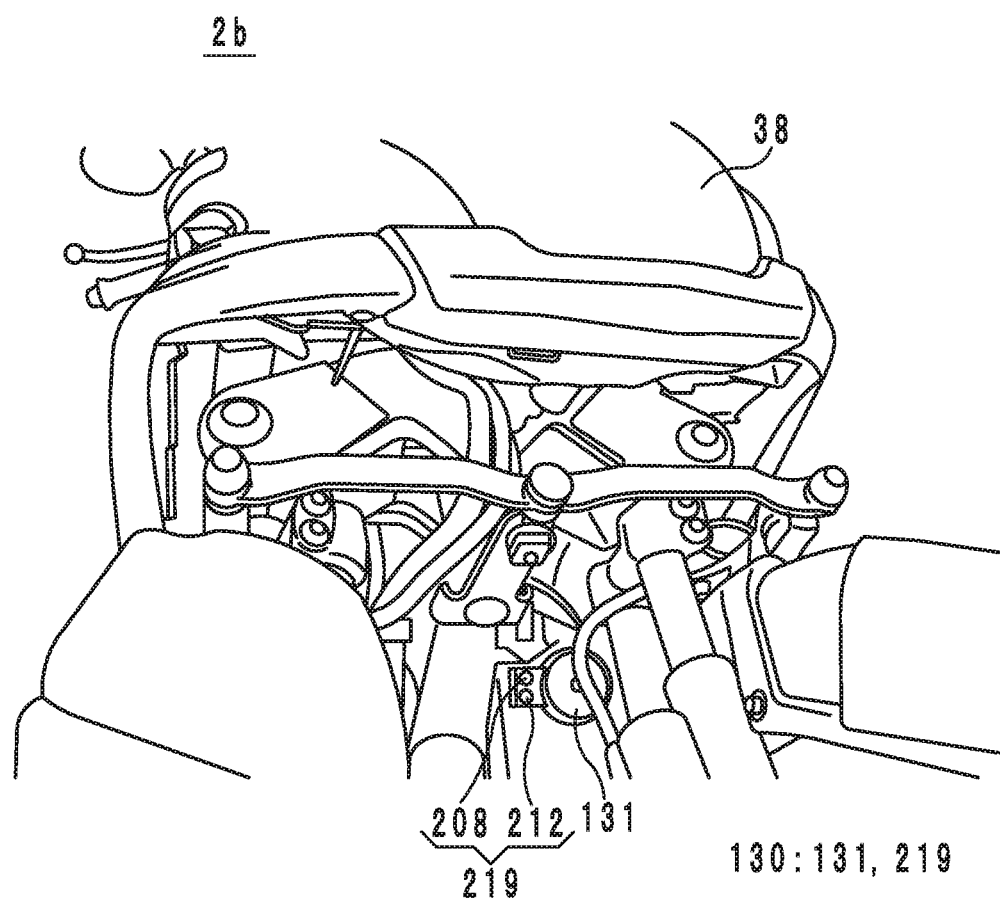
FIG. 20 is a perspective view of the leaning vehicle 2b as viewed from a frontward and downward area.

In the leaning vehicle 2b, the switch unit 219 may be included in the horn unit 130. FIG. 20 is a perspective view of the leaning vehicle 2b as viewed from a frontward and downward area.

The horn unit 130 includes the horn 131 and the switch unit 219. The horn 131 is disposed behind and below the front light unit 38. The horn 131 is disposed within the center region AC. In addition, the horn 131 is disposed at a position that is visible from a frontward and downward area when the leaning vehicle 2b is in an upright state.

The switch unit 219 is disposed to the right of the horn 131. Hence, the switch unit 219 is disposed within the center region AC. Further, the switch unit 219 is disposed at a position that is visible from a frontward and downward area when the leaning vehicle 2 is in an upright state. Therefore, the switch unit 219 is disposed at a position that is visible in one or more horizontal directions when the leaning vehicle 2b is in an overturned state. Since the details of the switch unit 219 have already been described above, a detailed description thereof is omitted here.

As described above, the horn unit 130 is an electrical parts assembly with a cancel switch that can be detachably attached to the vehicle body 4 in a state in which a plurality of parts that include the notification switch 208, the cancel switch 212 and the horn 131 (an example of at least one electrical part that is different from the first cancel switch) are combined.

Fourth Embodiment

Figure 21:
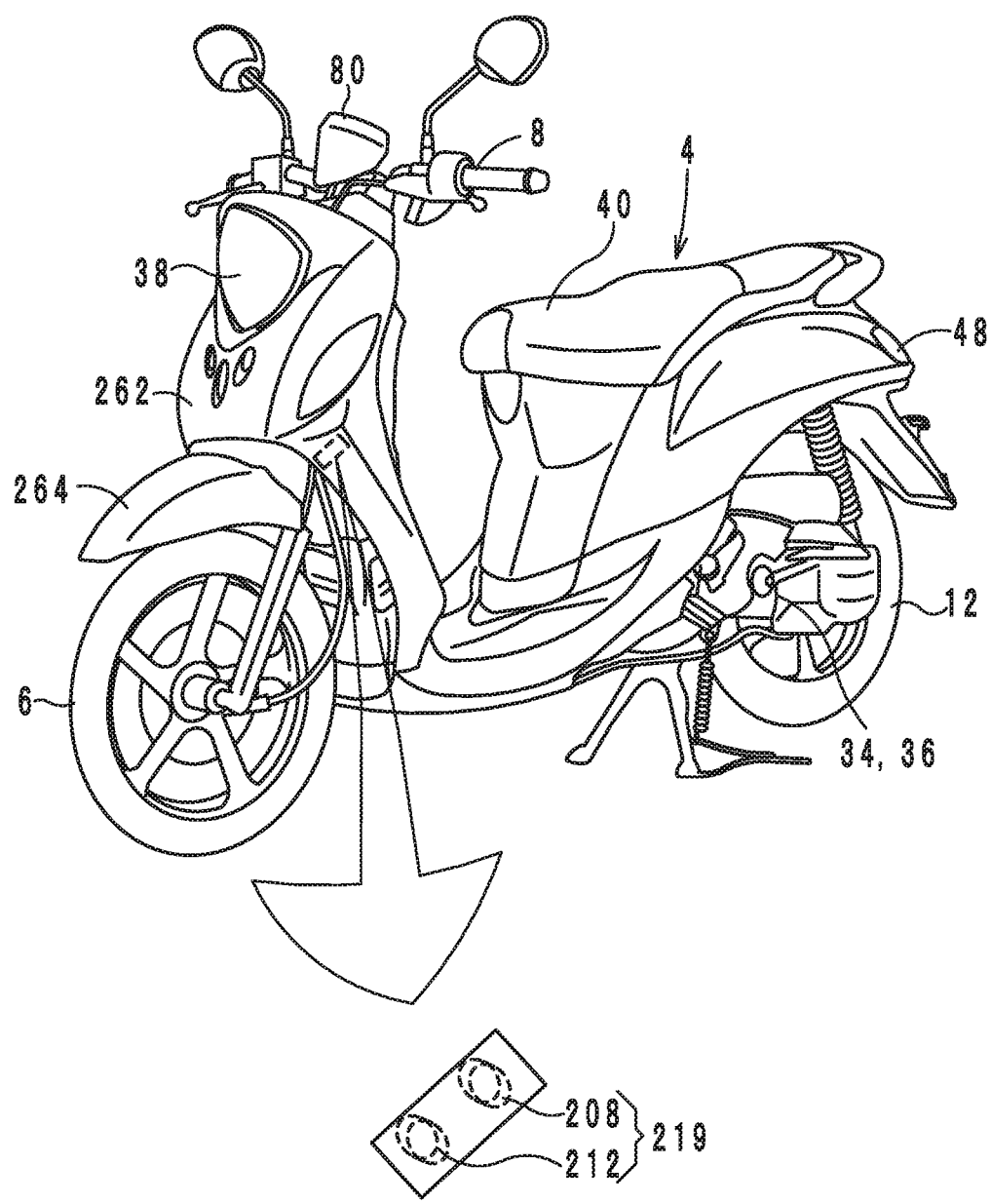
FIG. 21 is a perspective view of a leaning vehicle 2c.

Next, a leaning vehicle 2c according to a fourth embodiment will be described while referring to FIG. 21. FIG. 21 is a perspective view of the leaning vehicle 2c.

The leaning vehicle 2c is a scooter-type motorcycle. In the leaning vehicle 2c, similarly to the leaning vehicle 2, the switch unit 219 may be included in the front light unit 38, the tail light unit 48, the license plate light unit 50 (not illustrated in FIG. 21) or the horn unit 130 (not illustrated in FIG. 21). However, a description of an example in which the switch unit 219 is included in the front light unit 38, the tail light unit 48, the license plate light unit 50 or the horn unit 130 is omitted here. Hereunder, examples in which, in the leaning vehicle 2c, the switch unit 219 is included in the meter unit 80 or a key cylinder unit 260, and in which the switch unit 219 is disposed in a front cowl 262 are described. Note that, unlike the leaning vehicle 2, the leaning vehicle 2c does not include the switch unit 220. However, the leaning vehicle 2c may include the switch unit 220, similarly to the leaning vehicle 2.

[Front Cowl]

In the leaning vehicle 2c, the switch unit 219 may be disposed in the front cowl 262. The leaning vehicle 2c includes the front cowl 262 and a front fender 264. The front fender 264 is disposed above the steerable wheel 6. The front fender 264 covers an upper portion of the steerable wheel 6. The front cowl 262 is a vehicle body cover that covers a front portion of the vehicle body 4 (that is, one portion of the vehicle body 4). The front cowl 262 is located above the front fender 264.

The switch unit 219 is disposed on a face that faces the vehicle body 4 in the front cowl 262. That is, the switch unit 219 is disposed on a back face of the front cowl 262. However, the switch unit 219 is disposed within the center region AC. In addition, the switch unit 219 is disposed at a position that is visible in one or more horizontal directions when the leaning vehicle 2c is in an overturned state. Specifically, the switch unit 219 is disposed in the back face of the front cowl 262 at a position that is located further leftward and upward than the front fender 264. By this means, when the leaning vehicle 2c is in an overturned state, the rider can visually recognize the switch unit 219 in one or more horizontal directions through a gap between the front cowl 262 and the front fender 264. Since the details of the switch unit 219 have already been described above, a detailed description thereof is omitted here.

[Meter Unit]

Figure 22:
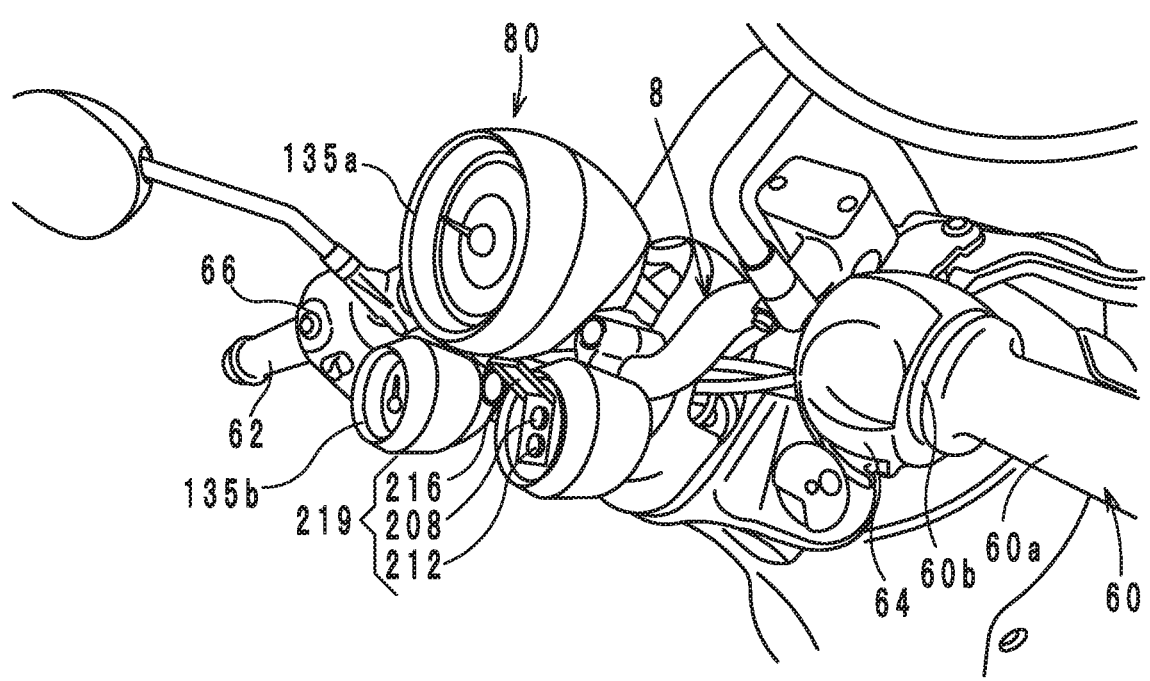
FIG. 22 is a perspective view of a handle 8 and a meter unit 80 as viewed from a rightward and upward area.

The switch unit 219 may be included in the meter unit 80. FIG. 22 is a perspective view of the handle 8 and the meter unit 80 as viewed from a rightward and upward area.

The meter unit 80 includes the meters 135 and the switch unit 219. The meters 135 include a speedometer 135a and a fuel gauge 135b. The speedometer 135a and the fuel gauge 135b are mechanical meters that have a needle and a dial. The speedometer 135a is disposed at a position that is above the handle 8 and is at the center in left-right direction of the leaning vehicle 2c in an upright state. The fuel gauge 135b is disposed at a position that, in the leaning vehicle 2c in an upright state, is located further leftward and backward than the speedometer 135a. The meters 135 are disposed within the center region AC. Further, the meters 135 are visible from a backward and upward area when the leaning vehicle 2c is in an upright state.

The switch unit 219 is disposed further rightward and backward than the speedometer 135a. Hence, the switch unit 219 is disposed within the center region AC. Further, the switch unit 219 is disposed at a position that is visible from a backward and upward area when the leaning vehicle 2c is in an upright state. Therefore, the switch unit 219 is disposed at a position that is visible in one or more horizontal directions when the leaning vehicle 2c is in an overturned state. Since the details of the switch unit 219 have already been described above, a detailed description thereof is omitted here.

As described above, the meter unit 80 is an electrical parts assembly with a cancel switch that can be detachably attached to the vehicle body 4 in a state in which a plurality of parts that include the notification switch 208, the cancel switch 212 and the meters 135 (an example of at least one electrical part that is different from the first cancel switch) are combined.

[Key Cylinder Unit]

Figure 23:
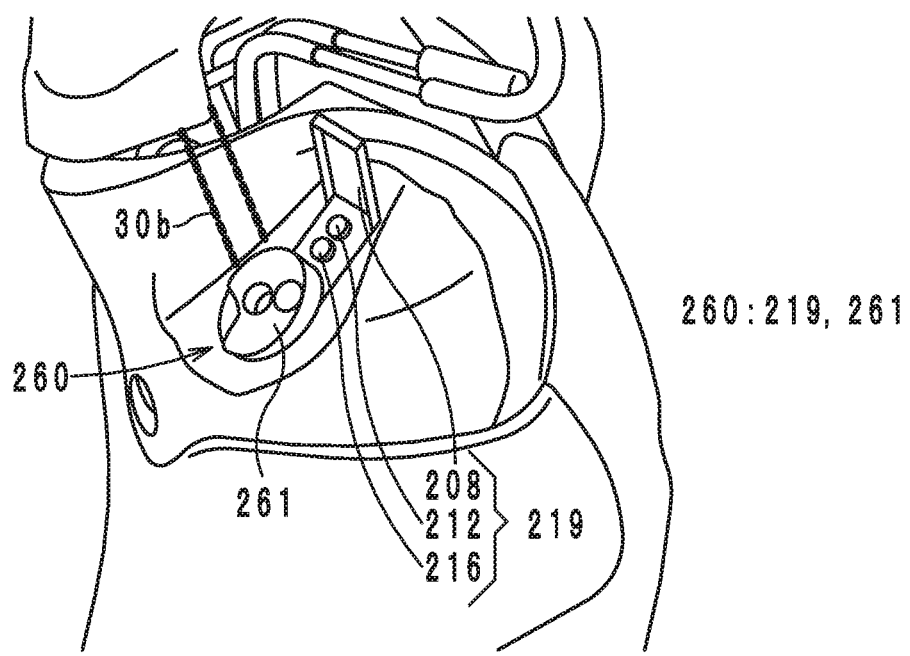
FIG. 23 is a perspective view of a key cylinder unit 260.

In the leaning vehicle 2c, the switch unit 219 may be included in the key cylinder unit 260. FIG. 23 is a perspective view of the key cylinder unit 260.

The leaning vehicle 2c includes the key cylinder unit 260. The key cylinder unit 260 includes a key cylinder 261 and the switch unit 219. In the leaning vehicle 2c in an upright state, the key cylinder 261 is disposed to the right of the head pipe 30b. That is, in the leaning vehicle 2c in an upright state, the key cylinder 261 is disposed below the right portion of the handle 8. Hence, the key cylinder 261 is disposed within the center region AC. In addition, in the leaning vehicle 2c in an upright state, the key cylinder 261 is disposed at a position that is visible from a backward and upward area.

The switch unit 219 is disposed in front of the key cylinder 261. Hence, the switch unit 219 is disposed within the center region AC. Further, the switch unit 219 is disposed at a position that is visible from a backward and upward area when the leaning vehicle 2c is in an upright state. Therefore, the switch unit 219 is disposed at a position that is visible in one or more horizontal directions when the leaning vehicle 2c is in an overturned state. Since the details of the switch unit 219 have already been described above, a detailed description thereof is omitted here.

As described above, the key cylinder unit 260 is an electrical parts assembly with a cancel switch that can be detachably attached to the vehicle body 4 in a state in which a plurality of parts that include the notification switch 208, the cancel switch 212 and the key cylinder 261 (an example of at least one electrical part that is different from the first cancel switch) are combined.

Fifth Embodiment

Figure 24:
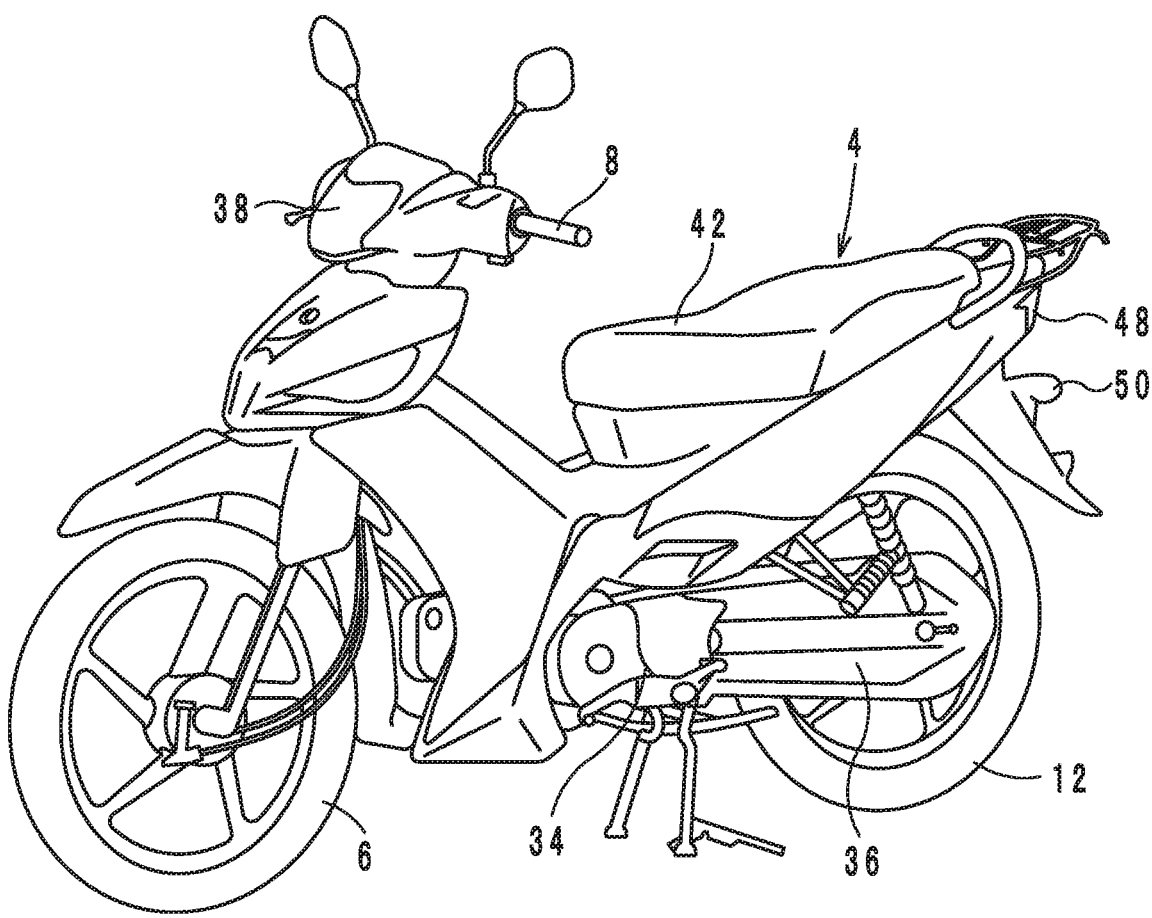
FIG. 24 is a perspective view of a leaning vehicle 2d.

Next, a leaning vehicle 2d according to a fifth embodiment is described while referring to FIG. 24. FIG. 24 is a perspective view of the leaning vehicle 2d.

The leaning vehicle 2d is a moped-type motorcycle. In the leaning vehicle 2d, the front light unit 38 and the meter unit 80 (not illustrated in FIG. 24) are integrated with the handle 8. That is, when the leaning vehicle 2d is viewed from the upward area, the front light unit 38 and the meter unit 80 can turn clockwise and counterclockwise together with the handle 8. In the leaning vehicle 2d, similarly to the leaning vehicle 2, the switch unit 219 may be included in the front light unit 38, the tail light unit 48, the license plate light unit 50 or the horn unit 130 (not illustrated in FIG. 24). However, a description of an example in which the switch unit 219 is included in the front light unit 38, the tail light unit 48, the license plate light unit 50 or the horn unit 130 is omitted here. Hereunder, an example in which, in the leaning vehicle 2d, the switch unit 219 is included in the meter unit 80 is described. Note that, unlike the leaning vehicle 2, the leaning vehicle 2d does not include the switch unit 220. However, the leaning vehicle 2d may include the switch unit 220, similarly to the leaning vehicle 2.

[Meter Unit]

Figure 25:
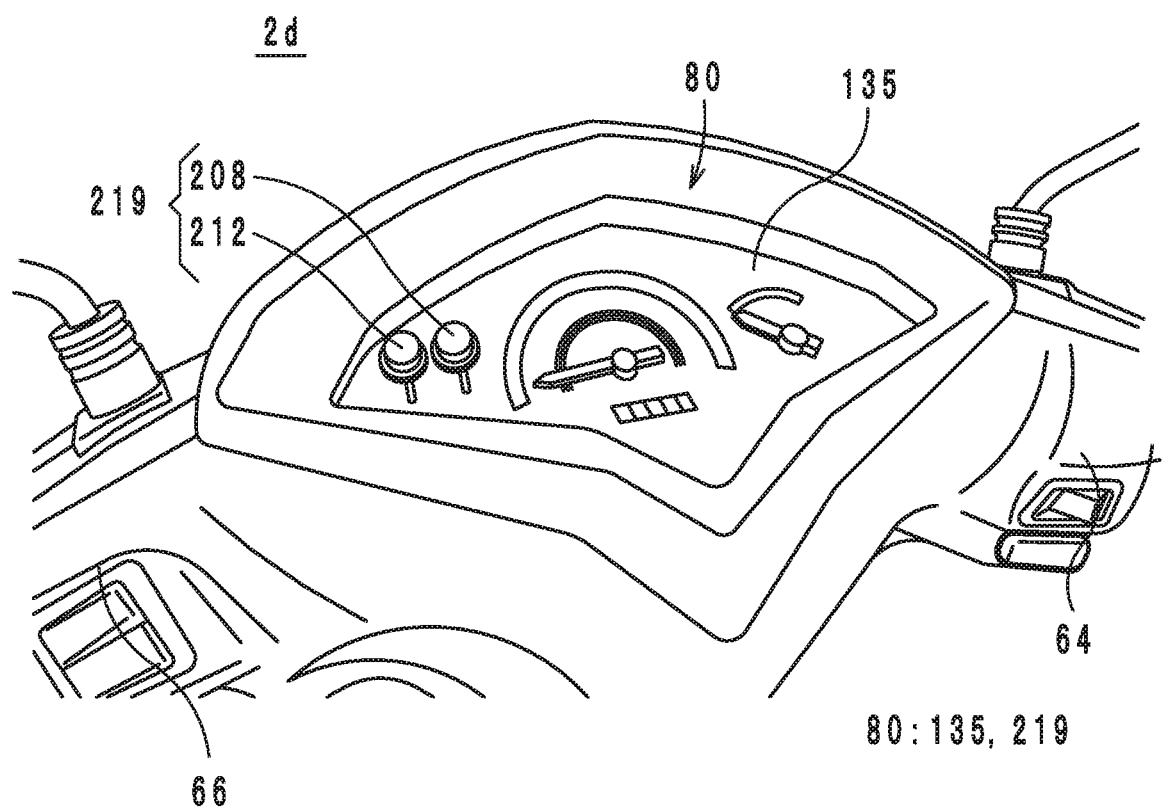
FIG. 25 is a perspective view of a meter unit 80 as viewed from a rearward and upward area.
Figure 26:
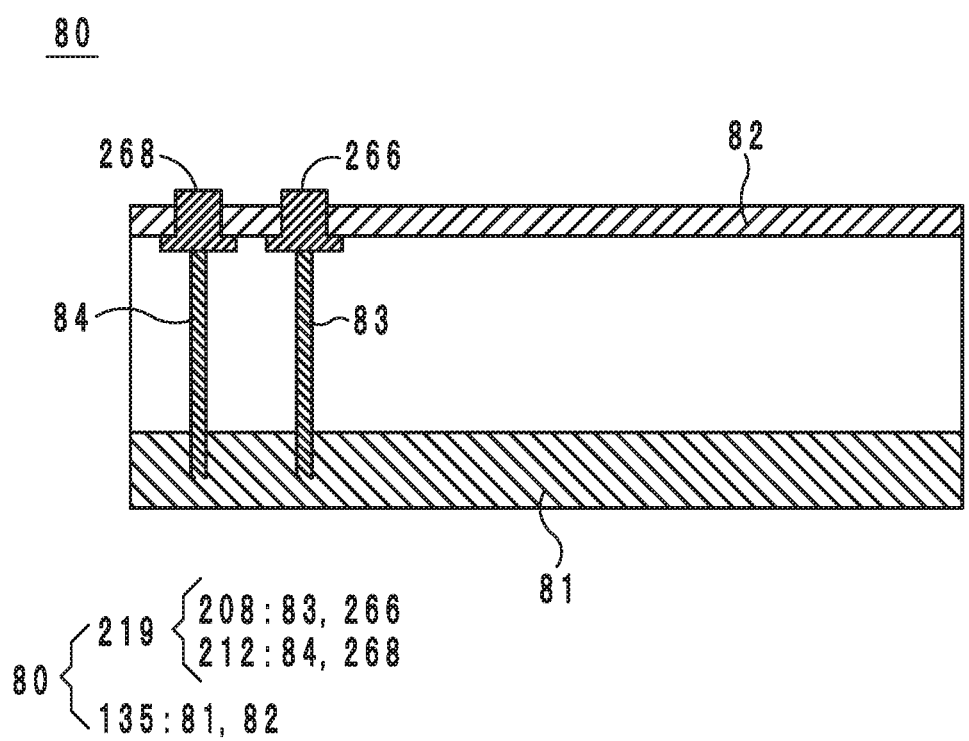
FIG. 26 is a cross-sectional structural drawing of the meter unit 80.

In the leaning vehicle 2d, the switch unit 219 may be included in the meter unit 80. FIG. 25 is a perspective view of the meter unit 80 as viewed from a rearward and upward area. FIG. 26 is a cross-sectional structural drawing of the meter unit 80.

The meter unit 80 includes the meters 135 and the switch unit 219. The meters 135 are mechanical meters that have a needle and a dial. The meters 135 include a meter main body 81 and a cover 82 (see FIG. 26). The meter main body 81 includes a needle and a dial. The cover 82 is a transparent plate that is disposed above the meter main body 81. The cover 82 protects the meter main body 81. The meters 135 are disposed at a position that is at the center in the left-right direction of the leaning vehicle 2d in an upright state and is above the handle 8. Hence, the meters 135 are disposed within the center region AC. In addition, the meters 135 are visible from a backward and upward area when the leaning vehicle 2d is in an upright state.

The switch unit 219 is included in the meter unit 80. Therefore, the switch unit 219 can turn together with the handle 8. The switch unit 219 includes the notification switch 208 and the cancel switch 212. The notification switch 208 and the cancel switch 212 are disposed to the left of the meter unit 80. The notification switch 208 includes a pin 83 and a notification button 266 (see FIG. 26). The pin 83 extends upward from the meter main body 81. The notification button 266 is disposed at a top end portion of the pin 83. As a result of being pushed upward by the pin 83, the notification button 266 projects upward from the cover 82 through a hole provided in the cover 82. Further, when the notification button 266 is pushed downward, the pin 83 is pushed downward and the notification switch 208 is thereby switched on. The cancel switch 212 includes a pin 84 and a cancel button 268 (see FIG. 26). The pin 84 extends upward from the meter main body 81. The cancel button 268 is disposed at the top end portion of the pin 84. As a result of being pushed upward by the pin 84, the cancel button 268 projects upward from the cover 82 through a hole provided in the cover 82. Further, when the cancel button 268 is pushed downward, the pin 84 is pushed downward and the cancel switch 212 is thereby switched on.

Since the switch unit 219 configured as described above is disposed to the left of the meter unit 80, the switch unit 219 is disposed within the center region AC. Further, the switch unit 219 is disposed at a position that is visible from a backward and upward area when the leaning vehicle 2d is in an upright state. Therefore, the switch unit 219 is disposed at a position that is visible in one or more horizontal directions when the leaning vehicle 2d is in an overturned state.

As described above, the meter unit 80 is an electrical parts assembly with a cancel switch that can be detachably attached to the vehicle body 4 in a state in which a plurality of parts that include the notification switch 208, the cancel switch 212 and the meters 135 (an example of at least one electrical part that is different from the first cancel switch) are combined.

Sixth Embodiment

Figure 27:
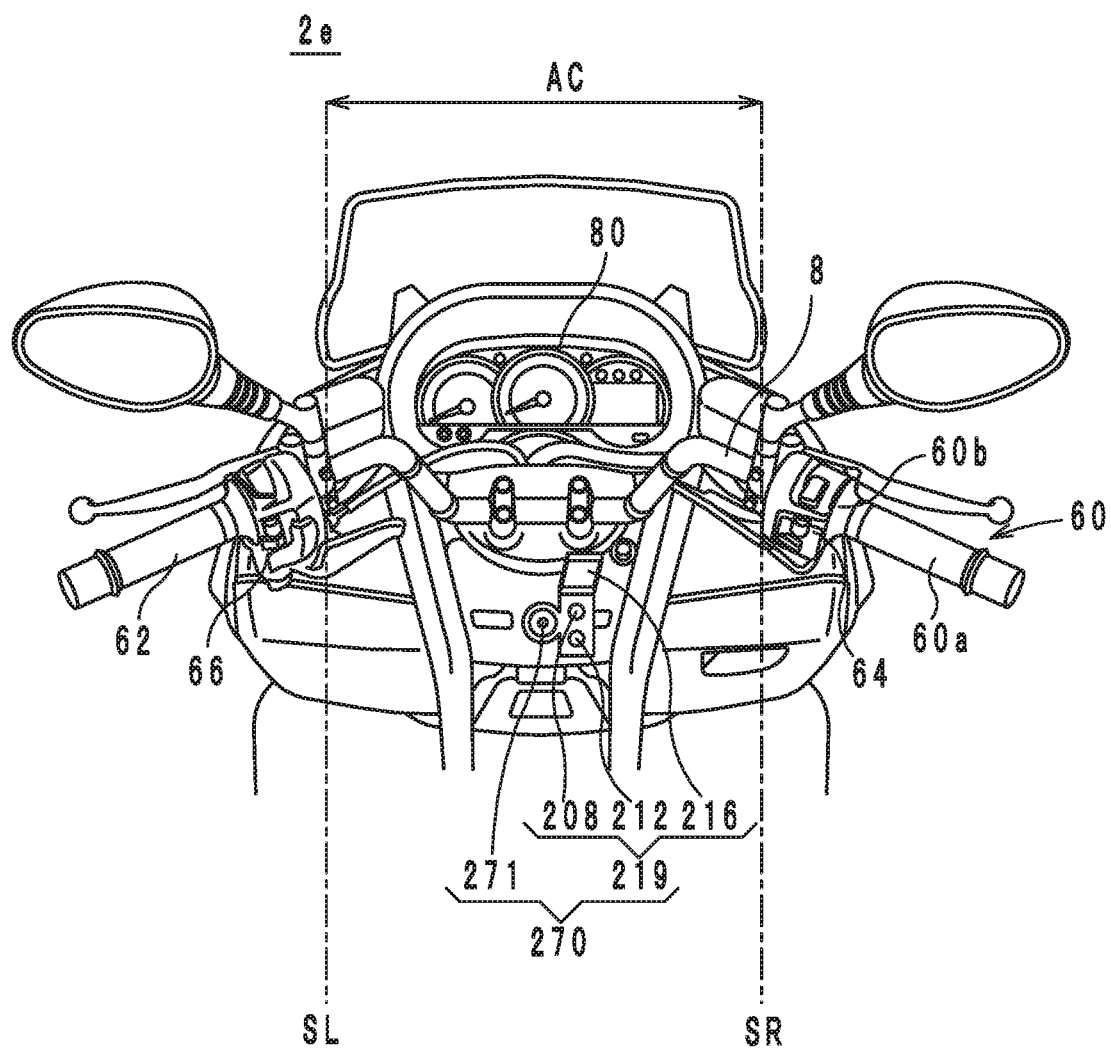
FIG. 27 is a perspective view of a handle 8 and a meter unit 80 of a leaning vehicle 2e as viewed from a rearward and upward area.

Next, a leaning vehicle 2e according to a sixth embodiment will be described while referring to FIG. 27. FIG. 27 is a perspective view of the handle 8 and the meter unit 80 of the leaning vehicle 2e as viewed from a rearward and upward area.

The leaning vehicle 2e is a scooter-type motorcycle. The leaning vehicle 2e includes a smart key system. When the rider approaches the leaning vehicle 2e while holding a smart key, the smart key system automatically authenticates the ID of the smart key. If the authentication of the ID is successful, the power supply of the leaning vehicle 2e is turned on upon the rider turning on a main switch 271 of a main switch unit 270 of the leaning vehicle 2e.

The main switch unit 270 includes a main switch 271 and the switch unit 219. The main switch 271 is disposed at a position that is at the center in the left-right direction of the vehicle body 4 and is located further backward and downward than the handle 8. Hence, the main switch 271 is disposed within the center region AC.

In addition, the main switch 271 is disposed at a position that is visible from a backward and upward area when the leaning vehicle 2e is in an upright state.

The switch unit 219 is disposed to the right of the main switch 271. Hence, the switch unit 219 is disposed within the center region AC. Further, the switch unit 219 is disposed at a position that is visible from a backward and upward area when the leaning vehicle 2e is in an upright state. Therefore, the switch unit 219 is disposed at a position that is visible in one or more horizontal directions when the leaning vehicle 2e is in an overturned state.

As described above, the main switch unit 270 is an electrical parts assembly with a cancel switch that can be detachably attached to the vehicle body 4 in a state in which a plurality of parts that include the notification switch 208, the cancel switch 212 and the main switch 271 (an example of at least one electrical part that is different from the first cancel switch) are combined.

Seventh Embodiment

Figure 28:
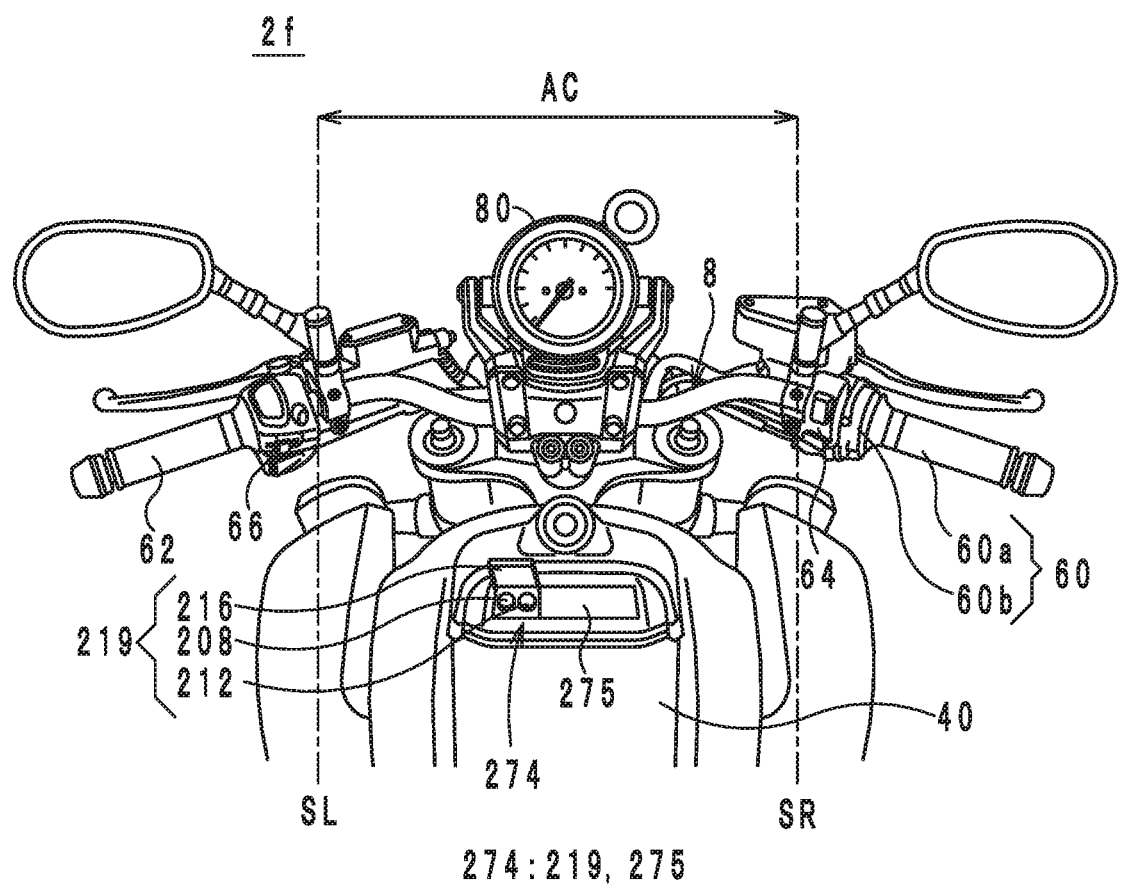
FIG. 28 is a perspective view of a handle 8 and a display section unit 274 of a leaning vehicle 2f as viewed from a rearward and upward area.

Next, a leaning vehicle 2f according to a seventh embodiment will be described while referring to FIG. 28. FIG. 28 is a perspective view of the handle 8 and a display section unit 274 of the leaning vehicle 2f as viewed from a rearward and upward area.

The leaning vehicle 2f is a cruiser-type motorcycle. The leaning vehicle 2f includes a display section unit 274. The display section unit 274 includes a display section 275 and the switch unit 219. The display section 275 is not particularly limited, and for example is a liquid crystal panel or an organic EL panel. The display section 275, for example, displays an odometer, a trip meter and a clock and the like. The display section 275 is disposed on the top surface of the tank 40 at a position that is at the center in the left-right direction of the vehicle body 4. Hence, the display section 275 is disposed within the center region AC. In addition, the display section 275 displays an image in a backward and upward direction.

The switch unit 219 is disposed to the left of the display section 275. Hence, the switch unit 219 is disposed within the center region AC. Further, the switch unit 219 is disposed at a position that is visible from a backward and upward area when the leaning vehicle 2f is in an upright state. Therefore, the switch unit 219 is disposed at a position that is visible in one or more horizontal directions when the leaning vehicle 2f is in an overturned state.

As described above, the display section unit 274 is an electrical parts assembly with a cancel switch that can be detachably attached to the vehicle body 4 in a state in which a plurality of parts that include the notification switch 208, the cancel switch 212 and the display section 275 (an example of at least one electrical part that is different from the first cancel switch) are combined.

Note that the tank 40 may be a dummy tank in which fuel is not stored.

Other Embodiments

The embodiments and modifications described and/or illustrated in this specification are described in order to facilitate understanding of the present invention, and do not limit the concept of the present disclosure. The foregoing embodiments and modifications can be changed or modified without departing from the gist thereof.

The gist in question also includes any embodiments including equivalent elements, corrections, deletions, combinations (for example, combinations of features across various embodiments and modifications), improvements, and/or changes that can be recognized by those having ordinary skill in the art based on the embodiments disclosed in this specification. The limitations of the appended claims should be broadly interpreted based on terms used in the appended claims, and the limitations should not be limited by the embodiments and modifications described in this specification or in the prosecution of the present application. The embodiments and modifications should be construed as non-exclusive. For example, in this specification the terms "preferably" and "may" are non-exclusive, and mean "preferable, but not limited to this" and "may be, but not limited to this".

A leaning vehicle according to the present invention is not limited to the leaning vehicles 2 and 2a to 2f, and can be changed within a range that does not depart from the gist thereof.

Note that, a position at which the switch unit 220 is disposed is not limited to the right switch box 65. Hereunder, a position at which the switch unit 220 is disposed will be described while referring to FIGS. 4 and 6. The three arrangement forms described hereunder may be adopted as arrangement forms for the switch unit 220.

(1) The switch unit 220 is disposed within the center region AC, and is disposed at a position that is not visible in one or more horizontal direction in the leaning vehicle 2 in an overturned state. As an example of the switch unit 220 that satisfies (1), for example, a switch unit 220a that is provided on the right side face of the seat rail 30c as illustrated in FIG. 4 may be mentioned.

(2) The switch unit 220 is disposed outside the center region AC, and is disposed at a position that is not visible in one or more horizontal direction in the leaning vehicle 2 in an overturned state. As an example of the switch unit 220 that satisfies (2), a switch unit 220b that is provided on the right side face of the tank 40 as illustrated in FIG. 4 may be mentioned.

(3) The switch unit 220 is disposed outside the center region AC, and is disposed at a position that is visible in one or more horizontal directions in the leaning vehicle 2 in an overturned state. The switch unit 220 described hereunder may be mentioned as an example of the switch unit 220 that satisfies (3). The leaning vehicle 2 includes the switch unit 219 shown in FIG. 7 and the switch unit 220 shown in FIG. 9. The switch unit 220 is an example of the switch unit 220 that satisfies (3).

Further, the leaning vehicle 2 includes two of the right switch boxes 64 and 65 and two of the left switch boxes 66 and 67. However, in the leaning vehicle 2, the number of right switch boxes and the number of left switch boxes is not limited thereto. It suffices that the number of right switch boxes is one or more. It suffices that the number of left switch boxes is one or more.

The switch cover 216 may be a color other than transparent. However, the color of the switch cover 216 is preferably different from the color of a member that is located in the area around the switch unit 219. Further, the color of the switch cover 216 may be the same as the color of a member that is located in the area around the switch unit 219. In this case, the color of the notification switch 208 and the cancel switch 212 is preferably different from the color of the member that is located in the area around the switch unit 219.

Note that, the notification switch 208 and the cancel switch 212 may be switches other than push-button-type switches. The notification switch 208 and the cancel switch 212 may be, for example, buttons that are displayed on a touch panel.

Note that the switch unit 219 may be included in a lighting device unit other than the front light unit, the tail light unit and the license plate light unit. An indicator unit may be mentioned as an example of a lighting device unit other than the front light unit, the tail light unit and the license plate light unit.

Note that a light source may be provided in the switch cover 216. Further, a light source may be provided in the area around the switch cover 216. In a case where any of the leaning vehicles 2 and 2a to 2f changed from a travelling state to an overturned state, the light source disposed in the switch cover 216 or the light source disposed in the area around the switch cover 216 radiates light.

Note that the electrical parts assembly with a cancel switch may protrude from the center region AC. It suffices that a portion of the electrical parts assembly with a cancel switch is disposed within the center region AC.

In the leaning-vehicle-overturn-notification-system 100, even in the notification completed state q3, by means of the cancel switches 212 and 214 the rider can cancel the notification of the overturn occurrence information Ia that was notified of by the leaning-vehicle-overturn-notification-system 100 to the center 102. However, a configuration may be adopted in which, in the leaning-vehicle-overturn-notification-system 100, the rider cannot cancel the notification of the overturn occurrence information Ia that was notified of by the leaning-vehicle-overturn-notification-system 100 to the center 102, by means of the cancel switches 212 and 214.

In the leaning-vehicle-overturn-notification-system 100, the control section 202 executes the overturn determination in step S8 in FIG. 3 and the notification determination in step S9 in FIG. 3 as separate steps. However, the control section 202 may execute the overturn determination and the notification determination in a single step. In this case, based on the determination base information I1, the control section 202 determines whether or not the overturning of the leaning vehicle 2 is overturning for which it is necessary to notify of the overturn occurrence information Ia to the center 102 by radio communication.

In the leaning-vehicle-overturn-notification-system 100, the rider operates the notification switches 208 and 210 or the cancel switches 212 and 214. However, a third party present in the area around the leaning vehicle 2 may operate the notification switches 208 and 210 or the cancel switches 212 and 214.

Further, the sensor 204 may be one portion of a sensor unit that can be detachably attached to the vehicle body 4. In this case, the sensor unit may be an electrical parts assembly with a cancel switch that can be detachably attached to the vehicle body 4 in a state in which a plurality of parts including the notification switch 208, the cancel switch 212 and the sensor 204 (an example of at least one electrical part that is different from the first cancel switch) are combined.

REFERENCE SIGNS LIST 2, 2a to 2f: Leaning Vehicle
4: Vehicle Body
6, 6a, 6b: Steerable Wheel
8: Handle
9: Steering Shaft
10: Front Fork
12: Drive Wheel
38: Front Light Unit
40: Tank
48: Tail Light Unit
50: License Plate Light Unit
60: Right Handle Grip
60a: Grip Section
60b: Detection Section
62: Left Handle Grip
64, 65: Right Switch Box
66, 67: Left Switch Box
80: Meter Unit
89: Tail Light
100: Leaning-vehicle-overturn-notification-system
102: Center
119: Front Light
125: License Plate Light
130: Horn Unit
131: Horn
135: Meter
208, 210: Notification Switch
212, 214: Cancel Switch
216, 218: Switch Cover
219, 220, 220a to 220c: Switch Unit
221: Alarm Section
250: Seat Cowl
252: Inner Cowl
254, 256: Outer Cowl
260: Key Cylinder Unit
261: Key Cylinder
262: Front Cowl
270: Main Switch Unit
271: Main Switch
274: Display Section Unit
275: Display Section
AC: Center Region
S208, S210, S212, S214: Operation Surface

What is claimed is:

1. A leaning vehicle in which a leaning-vehicle-overturn-notification-system that notifies of overturn occurrence information indicating that the leaning vehicle changed from a travelling state to an overturned state to outside of the leaning vehicle by radio communication is applied, the leaning vehicle comprising:
   a vehicle body that leans left when turning left and leans right when turning right,
   a steerable wheel,
   a handle that steers the steerable wheel to cause the vehicle body to lean, and
   a first cancel switch for cancelling notification to be made by the leaning-vehicle-overturn-notification-system of the overturn occurrence information to outside of the leaning vehicle by the radio communication, or for cancelling notification that has been made by the leaning-vehicle-overturn-notification-system of the overturn occurrence information to outside of the leaning vehicle by the radio communication;
   wherein:
   the handle includes a right handle grip, a left handle grip, one or more right switch boxes that are disposed further rightward than a center in a left-right direction of the leaning vehicle in an upright state and to the left of the right handle grip, and one or more left switch boxes that are disposed further leftward than the center in the left-right direction of the leaning vehicle in an upright state and to the right of the left handle grip,
   the one or more right switch boxes are arranged in a row in a leftward direction from a left end of the right handle grip,
   the one or more left switch boxes are arranged in a row in a rightward direction from a right end of the left handle grip, and
   the leaning vehicle satisfies (A) or (B):
   (A) the first cancel switch is, in the leaning vehicle in an upright state, disposed in a center region that is located between a plane perpendicular to the left-right direction that includes a left end of a right switch box that is disposed furthest to the left among the one or more right switch boxes, and a plane perpendicular to the left-right direction that includes a right end of a left switch box that is disposed furthest to the right among the one or more left switch boxes, and the first cancel switch is disposed at a position that is visible in one or more horizontal directions in the leaning vehicle in an overturned state;

(B) the leaning vehicle further comprises:

a first cancel switch cover that covers the first cancel switch, wherein:

the first cancel switch cover is, in the leaning vehicle in an upright state, disposed in a center region that is located between a plane perpendicular to the left-right direction that includes a left end of a right switch box that is disposed furthest to the left among the one or more right switch boxes, and a plane perpendicular to the left-right direction that includes a right end of a left switch box that is disposed furthest to the right among the one or more left switch boxes, and the first cancel switch cover is disposed at the position that is visible in the one or more horizontal directions in the leaning vehicle in the overturned state.

2. The leaning vehicle according to claim 1, further comprising:

a second cancel switch, wherein the leaning vehicle satisfies (C) or (D):

(C) the second cancel switch is disposed within the center region and is disposed at a position that is not visible in the one or more horizontal directions in the leaning vehicle in the overturned state, the second cancel switch is disposed outside the center region and is disposed at the position that is visible in the one or more horizontal directions in the leaning vehicle in the overturned state, or the second cancel switch is disposed outside the center region and is disposed at the position that is not visible in the one or more horizontal directions in the leaning vehicle in the overturned state;

(D) the leaning vehicle further comprises:

a second cancel switch cover that covers the second cancel switch, wherein:

the second cancel switch cover is disposed within the center region and is disposed at the position that is not visible in the one or more horizontal directions in the leaning vehicle in the overturned state, the second cancel switch cover is disposed outside the center region and is disposed at the position that is visible in the one or more horizontal directions in the leaning vehicle in the overturned state, or the second cancel switch cover is disposed outside the center region and is disposed at the position that is not visible in the one or more horizontal directions in the leaning vehicle in the overturned state.

3. The leaning vehicle according to claim 1, wherein:

the first cancel switch has an operation surface for touching by a rider when operating the first cancel switch, and the operation surface is directed in the one or more horizontal directions in the leaning vehicle in the overturned state.

4. The leaning vehicle according to claim 1, further comprising:

an electrical parts assembly with the first cancel switch that can be detachably attached to the vehicle body in a state in which a plurality of parts including the first cancel switch and at least one electrical part that is different from the first cancel switch are combined;

wherein at least one portion of the electrical parts assembly with the first cancel switch is disposed within the center region that, in the leaning vehicle in an upright state, is located between a plane perpendicular to the left-right direction that includes a left end of a right switch box and a plane perpendicular to the left-right direction that includes a right end of a left switch box.

5. The leaning vehicle according to claim 4, wherein:

the at least one electrical part is a lighting device, a horn, a meter, a sensor, a key cylinder or a switch of a smart key system.

6. The leaning vehicle according to claim 1, further comprising:

a vehicle body cover that covers a portion of the vehicle body;

wherein the first cancel switch is disposed on a face that faces the vehicle body in the vehicle body cover.

7. The leaning vehicle according to claim 1, wherein:

a color of the first cancel switch or the first cancel switch cover is different from a color of a member located in an area around the first cancel switch.

8. The leaning vehicle according to claim 7, wherein:

a color of the first cancel switch is different from a color of a member located in an area around the first cancel switch, and the first cancel switch cover is transparent.

9. The leaning vehicle according to claim 1, further comprising:

an alarm section that radiates a light or generates a sound when the leaning vehicle overturns, wherein the alarm section and the first cancel switch are disposed at positions that are simultaneously visible in the leaning vehicle in the overturned state.

10. The leaning vehicle according to claim 9, wherein:

in the leaning vehicle in the overturned state, the alarm section and the first cancel switch are visually recognizable simultaneously by a rider who operates the first cancel switch.

* * * * *